United States Patent
Kodaypak et al.

(10) Patent No.: US 12,375,840 B2
(45) Date of Patent: Jul. 29, 2025

(54) CONVERGED BROADBAND ACCESS SERVICE CONTROLLER (CBASC) FOR 5G NETWORKS

(71) Applicant: Radisys Corporation, Hillsboro, OR (US)

(72) Inventors: Rajendra Prasad Kodaypak, Hillsboro, OR (US); Ganesh Shenbagaraman, Frisco, TX (US)

(73) Assignee: Radisys Corporation, Hillsboro, OR (US)

( * ) Notice: Subject to any disclaimer, the term of this patent is extended or adjusted under 35 U.S.C. 154(b) by 320 days.

(21) Appl. No.: 18/320,949

(22) Filed: May 19, 2023

(65) Prior Publication Data

US 2024/0388820 A1 Nov. 21, 2024

(51) Int. Cl.
*H04W 28/16* (2009.01)
*H04L 47/80* (2022.01)
*H04Q 11/00* (2006.01)

(52) U.S. Cl.
CPC ....... *H04Q 11/0067* (2013.01); *H04L 47/805* (2013.01); *H04Q 2011/0086* (2013.01); *H04Q 2213/053* (2013.01)

(58) Field of Classification Search
CPC .................................................... H04W 28/16
See application file for complete search history.

(56) References Cited

U.S. PATENT DOCUMENTS

| | | | |
|---|---|---|---|
| 8,588,062 B1* | 11/2013 | Pan | H04L 69/14 370/395.5 |
| 2020/0351935 A1* | 11/2020 | Chapman | H04W 72/23 |
| 2020/0374955 A1* | 11/2020 | Dudda | H04W 76/15 |

OTHER PUBLICATIONS

Nakayama et al., "Novel C-RAN Architecture with PON based Midhaul and Wireless Relay Fronthaul", IEEE 17th Annual Consumer Communications & Network Conference, 2020 (Year: 2020).*

* cited by examiner

*Primary Examiner* — Shi K Li
(74) *Attorney, Agent, or Firm* — Stoel Rives LLP

(57) ABSTRACT

A converged broadband access service controller (CBASC) for a 5G network provides for management of a passive optical network (PON) midhaul transport network path and a coaxial cable midhaul transport network path by receiving from RAN intelligent controller (RIC) or a network management system (NMS) a trigger for selecting a midhaul transport network path. The CBASC determines, based on analysis of concurrent traffic being transported, a selected midhaul transport path from among the PON and coaxial cable midhaul transport network paths. And the CBASC generates triggers to allocate and set up a service flow for the selected midhaul transport network path.

22 Claims, 22 Drawing Sheets

CONVERGED BROADBAND ACCESS SERVICE CONTROLLER (CBASC) FOR 5G NETWORKS

TECHNICAL FIELD

This application relates generally to 5G fixed-mobile convergence (FMC) networks and, more particularly, to hybrid fiber-coaxial (HFC) networks and passive optical network (PON) in an xhaul (where "x" may be fronthaul, midhaul, or backhaul) for a 5G RAN.

BACKGROUND INFORMATION

Wireless mobile communication technology uses various standards and protocols to transmit data between a base station and a wireless mobile device. Wireless communication system standards and protocols may include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi®.

The latest 5G cellular networking standards support new use cases such as enhanced mobile broadband (eMBB), ultra-reliable low latency communications (URLLC), massive machine type communications (mMTC), cellular vehicle to anything (CV2X) communications and several others that will benefit the industrial revolution into the next decade. Different industry verticals will leverage 5G-enabled connectivity and its benefits in different ways. Mobile network operators will seek to deliver unique service-level agreements (SLAs) to their customers based on specific use cases and their end-to-end emerging cloud native network infrastructure deployments while supporting interworking with other legacy and emerging access technologies.

SUMMARY OF THE DISCLOSURE

Service providers, such as multiple systems operators (MSOs), fiber-to-the-home (FTTH) or fiber-to-the-premises (FTTP) (generally, FTTX), or 5G MNOs, are continuously exploring ways to offer high-speed symmetrical Gigabit per second (Gbps) services to customers. These services are intended to meet growing demands in consumer, enterprise, and wholesale traffic, and to support connectivity and service requirements in greenfield scenarios in urban, suburban, and rural areas.

FTTX providers are aggressively deploying fiber-based access technologies to deliver symmetrical Gbps services to their customers. Meanwhile, MSO providers are evolving their outside HFC plant infrastructure with node splits to provide symmetrical Gbps services to consumers and enterprise customers, although they are limited in terms of performance when compared to fiber-based access networks. MNOs are deploying 5G fixed wireless and upgrading their cellular networks from LTE to 5G to meet the demands of enhanced transport connections and quality of service required to support rich services (e.g., eMBB, URLLC, MIoT, CV2X, public safety, AR-VR-XR, gaming, and other services).

Some service providers, such as MSOs, offer a mix of different access technologies (HFC, FFTX, and wireless) to expand their customer base and drive revenue. They have access to all these access networks in certain geographical locations, allowing them to offer competitive services with rate plans based on higher capacity, speeds, and quality of experience at any given location and time of day.

Advancements in open standards, software-defined, disaggregated, and cloud-native infrastructure solutions are transforming the next generation of intelligent network architecture designs. As 5G becomes mainstream, the transport technologies would scale up to meet not only the speeds but also enhance the experience end user's device(s). With a mix of transport options available for radio access aggregation, 5G service providers seek to build smarter, intelligent controls as they evolve their radio access network infrastructure designs with new standards. Their network infrastructure design, management, and charging solutions could be unified, smart, programmable, coordinated, and automated to ensure the mix of traffic emerging from a variety of digital endpoint customers (devices, end-users, industry verticals, applications with unique service requirements, priorities) at any given location and time are transported effectively, with continuous learning models of traffic patterns and network utilizations.

To meet the demands of ultra-high-speed mobile broadband, low latency connections with massive density, massive connectivity, and ubiquitous accessibility, there is a need for convergence in 5G broadband networks. A smart converged broadband access solution enables network simplification, optimized end-user experience, improvements in the way we connect, live, work, learn, and evolve, and faster adoption of next-generation innovations such as digital endpoints, rich applications, and services. The availability of standards-based broadband access technologies empowers operators to expand their network infrastructure buildouts and services coverage footprint by deploying the right network for the right location at the right cost point.

To this end, disclosed is a converged broadband access service controller (CBASC) that interacts with multi-domain access/transport controllers via APIs and uses a policy driven method to steer bidirectional traffic between the disaggregated distributed unit (DU) and central unit (CU) networking points within the 5G radio access networking domain. Triggers for DU and CU end points are coordinated and initiated via the RAN intelligent controller (RIC) based on internal API triggers from CBASC.

With this design approach, service providers can make the best transport connectivity decisions for 5G devices/customers with targeted quality of service in the most efficient, cost-effective, and timely manner. The CBASC can be flexibly deployed in a distributed or centralized model based on the geographical traffic demands. The CBASC works across a spectrum of broadband access technologies and interacts via standards-based APIs to synthesize data-driven intelligence and generate dynamic triggers to switch traffic across transport network options that exist in a given location. Bidirectional traffic could be split across transport paths based on learning processes and network traffic patterns over time. This also helps them to instantiate dynamic network slicing instantiation/modification/de-instantiation on demand and manage via CBASC.

Additional aspects and advantages will be apparent from the following detailed description of embodiments, which proceeds with reference to the accompanying drawings.

BRIEF DESCRIPTION OF THE DRAWING FIGURES

To easily identify the discussion of any particular element or act, the most significant digit or digits in a reference number refer to the figure number in which that element is first introduced.

Figure 12A:
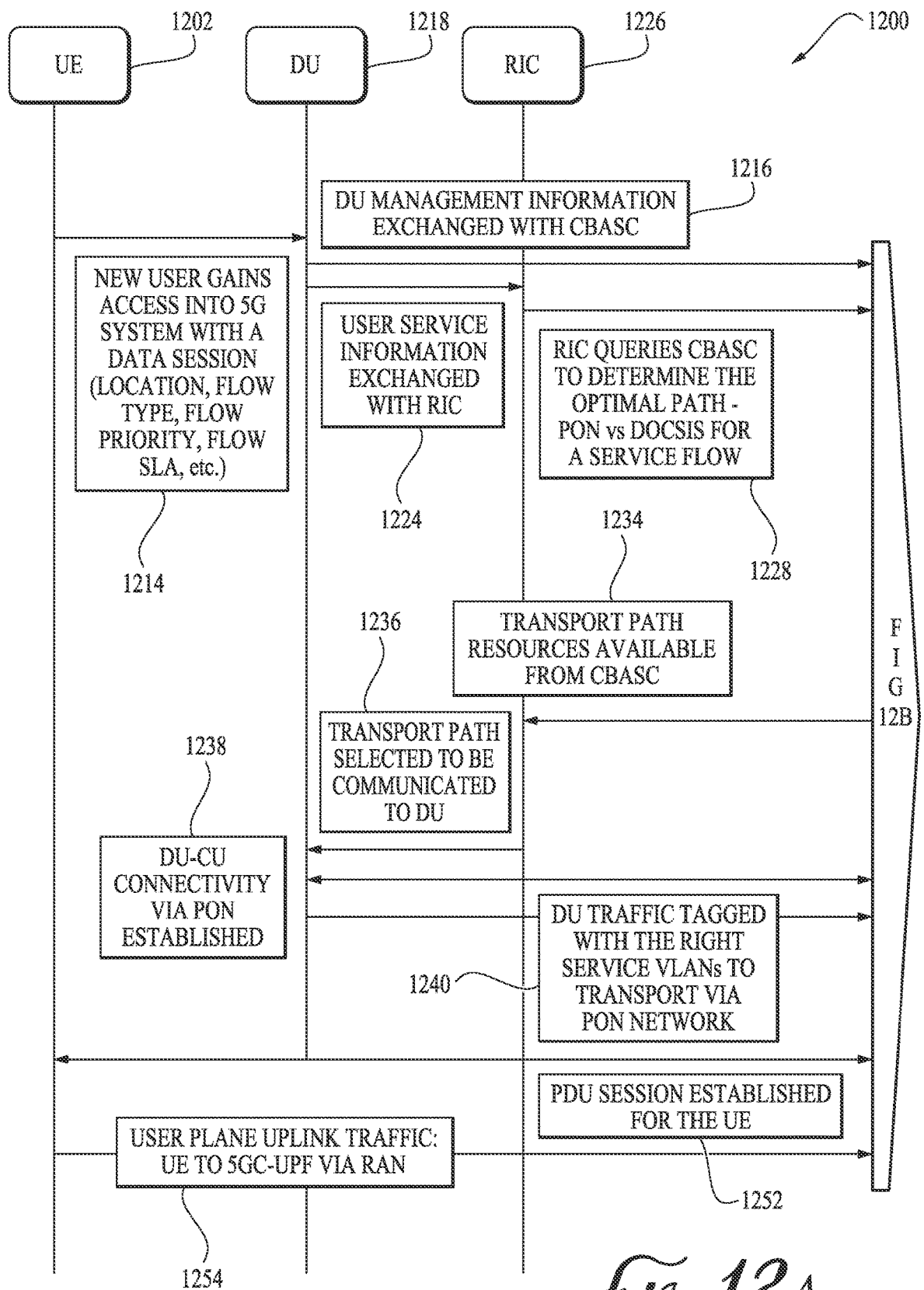
Figure 12B:
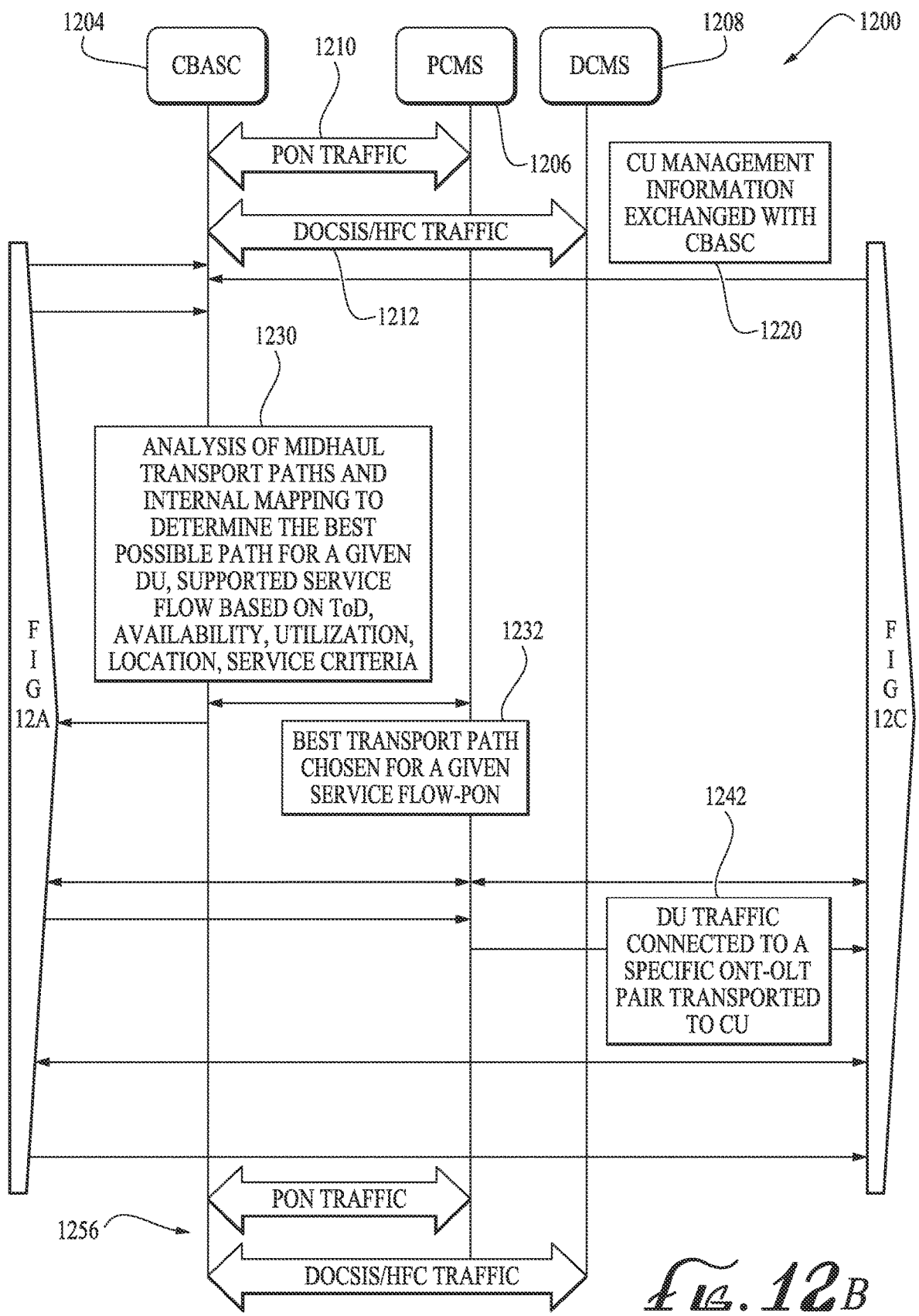
Figure 12C:
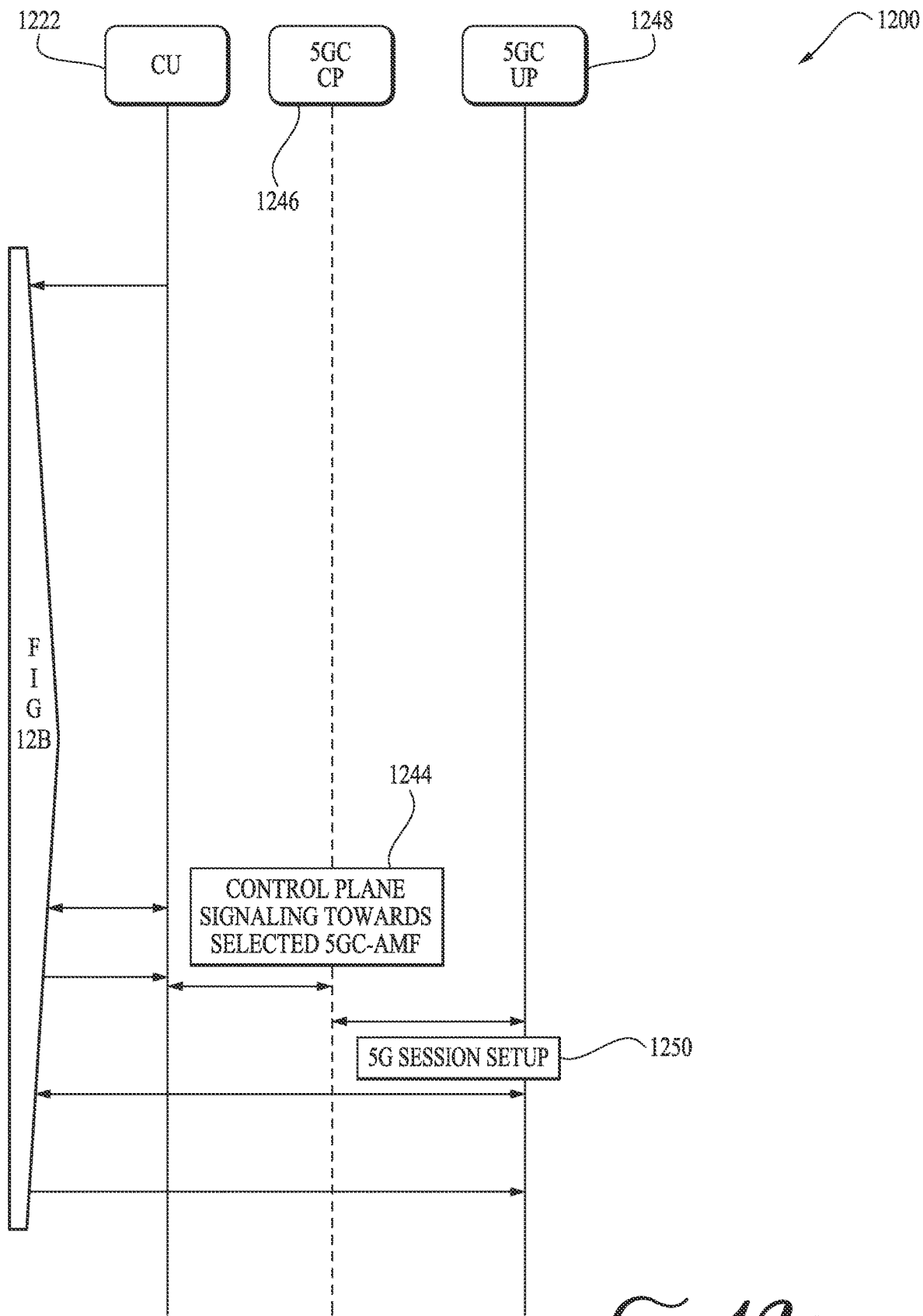

FIG. 12A, FIG. 12B, and FIG. 12C are, respectively, left-, middle-, and right-side portions of a message sequence diagram showing a process in accordance with one embodiment.

Figure 13A:
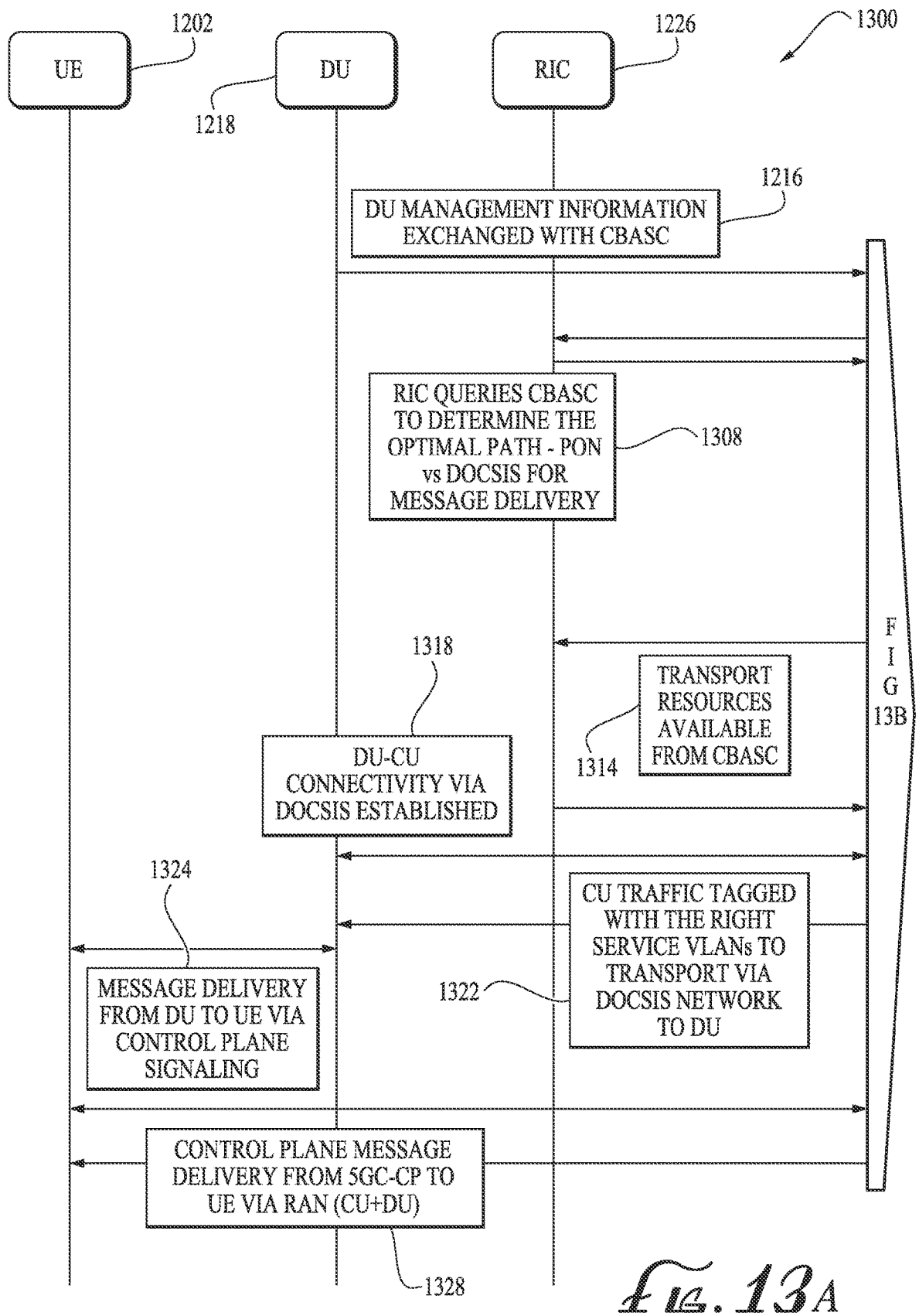
Figure 13B:
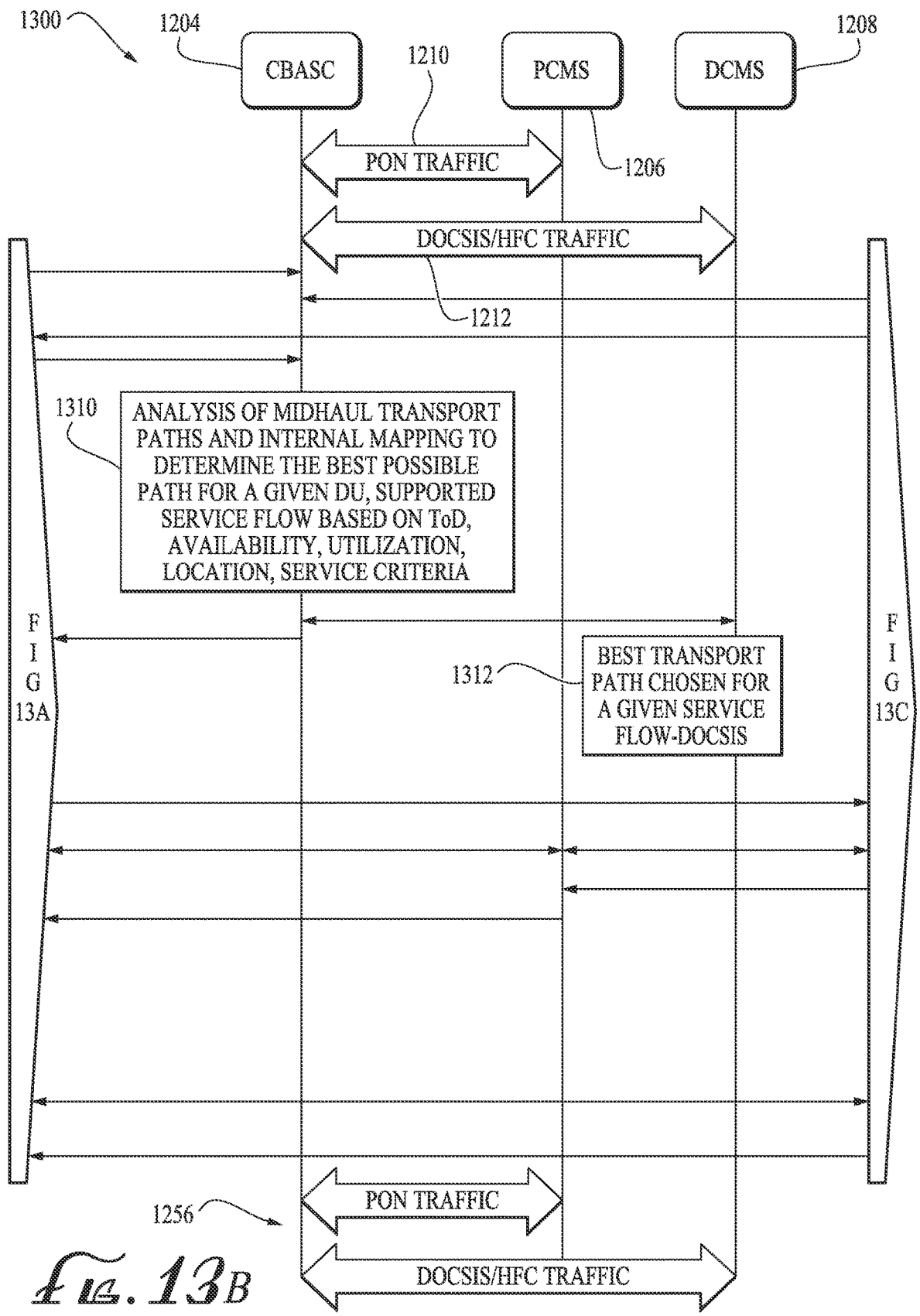
Figure 13C:
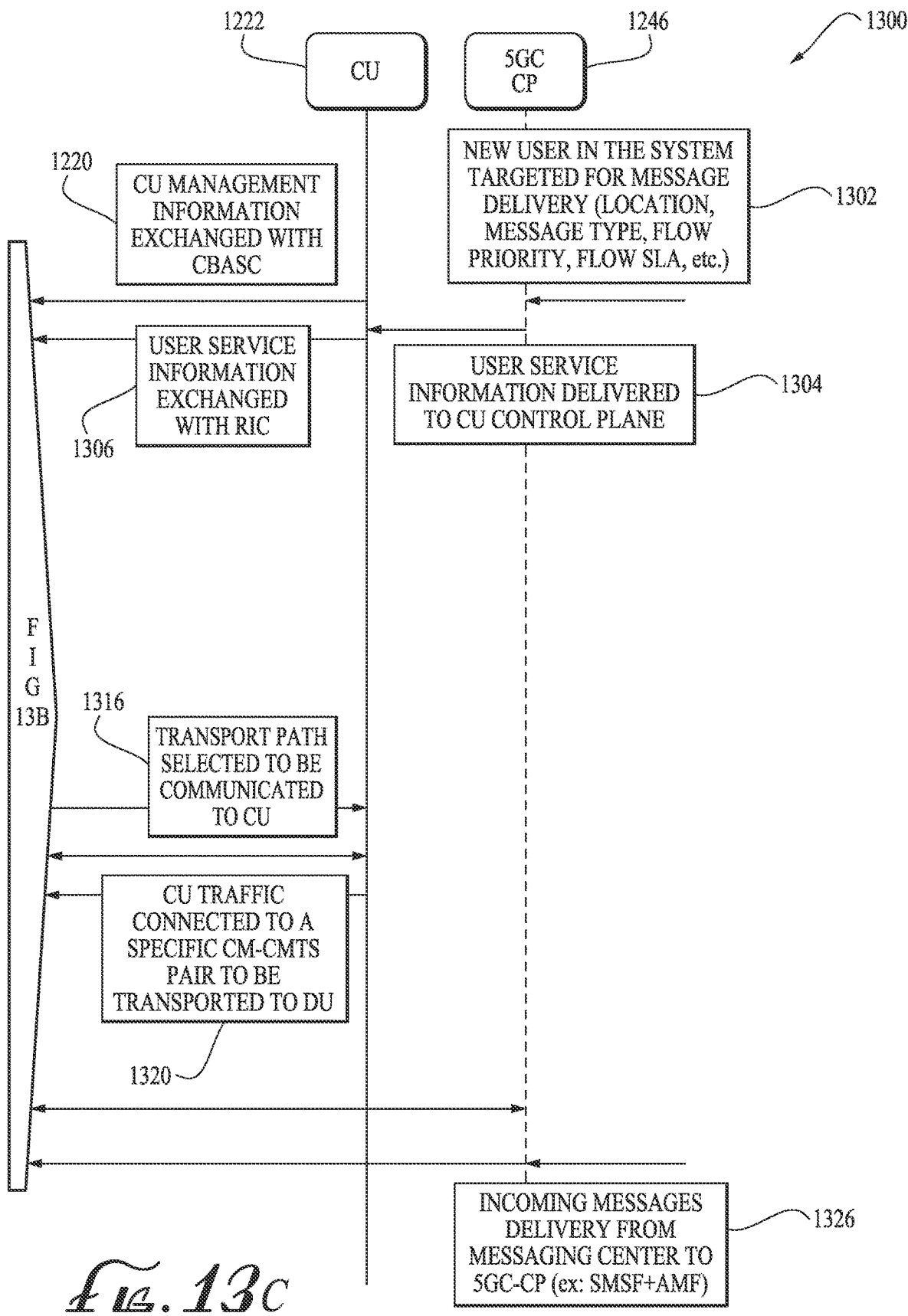

FIG. 13A, FIG. 13B, and FIG. 13C are, respectively, left-, middle-, and right-side portions of a message sequence diagram showing a process in accordance with one embodiment.

Figure 14A:
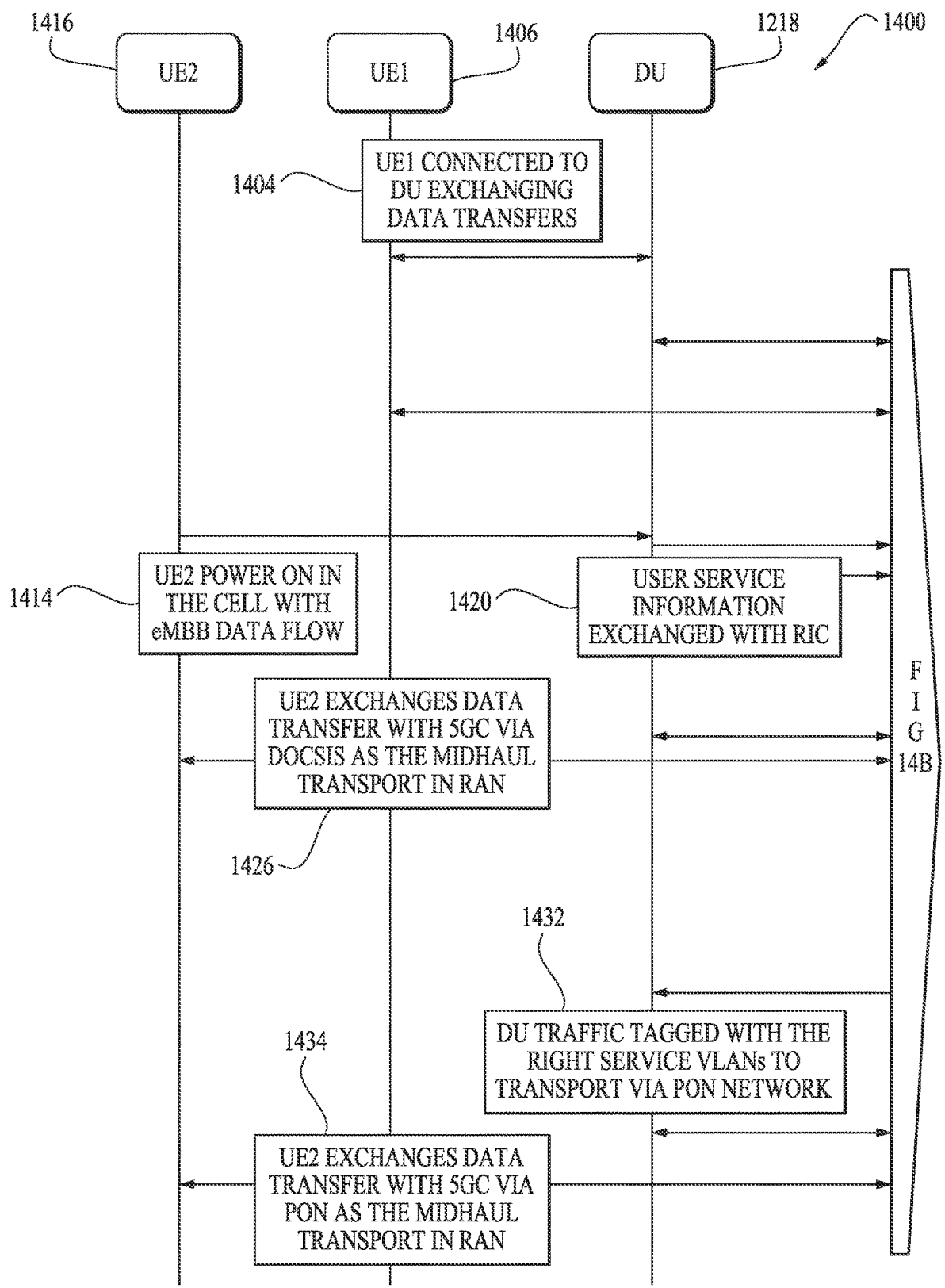
Figure 14B:
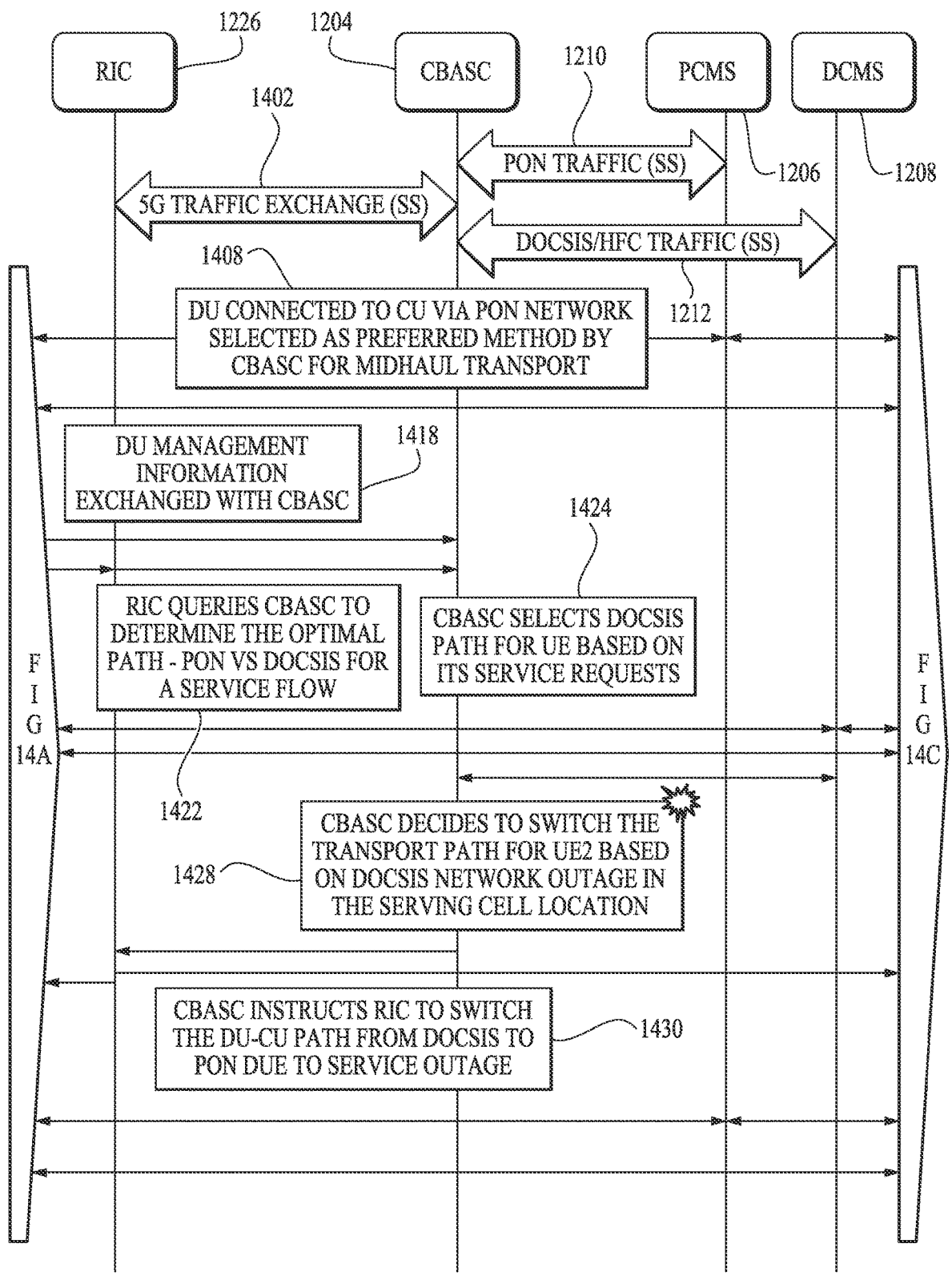
Figure 14C:
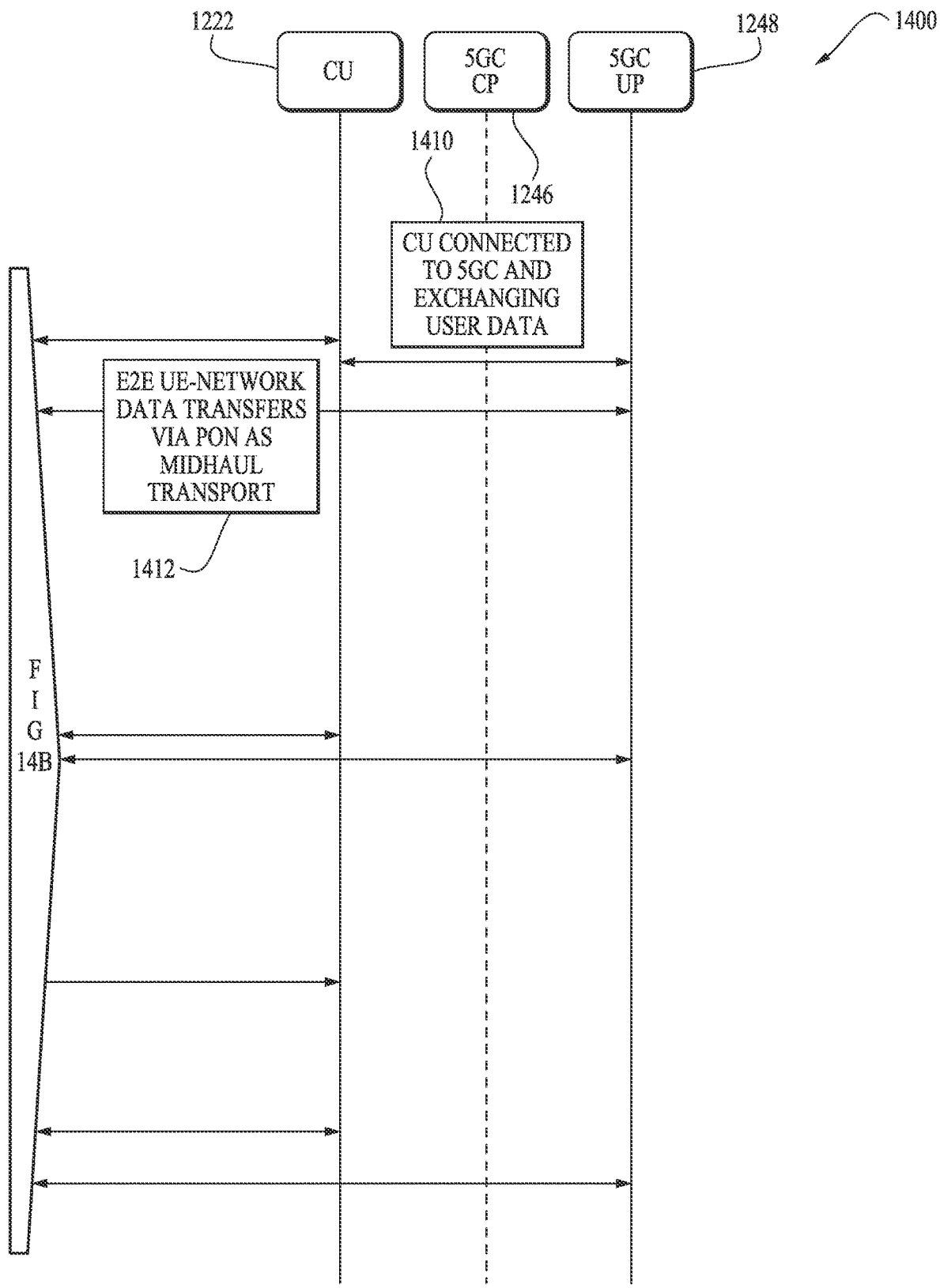

FIG. 14A, FIG. 14B, and FIG. 14C are, respectively, left-, middle-, and right-side portions of a message sequence diagram showing a process in accordance with one embodiment.

Figure 15:
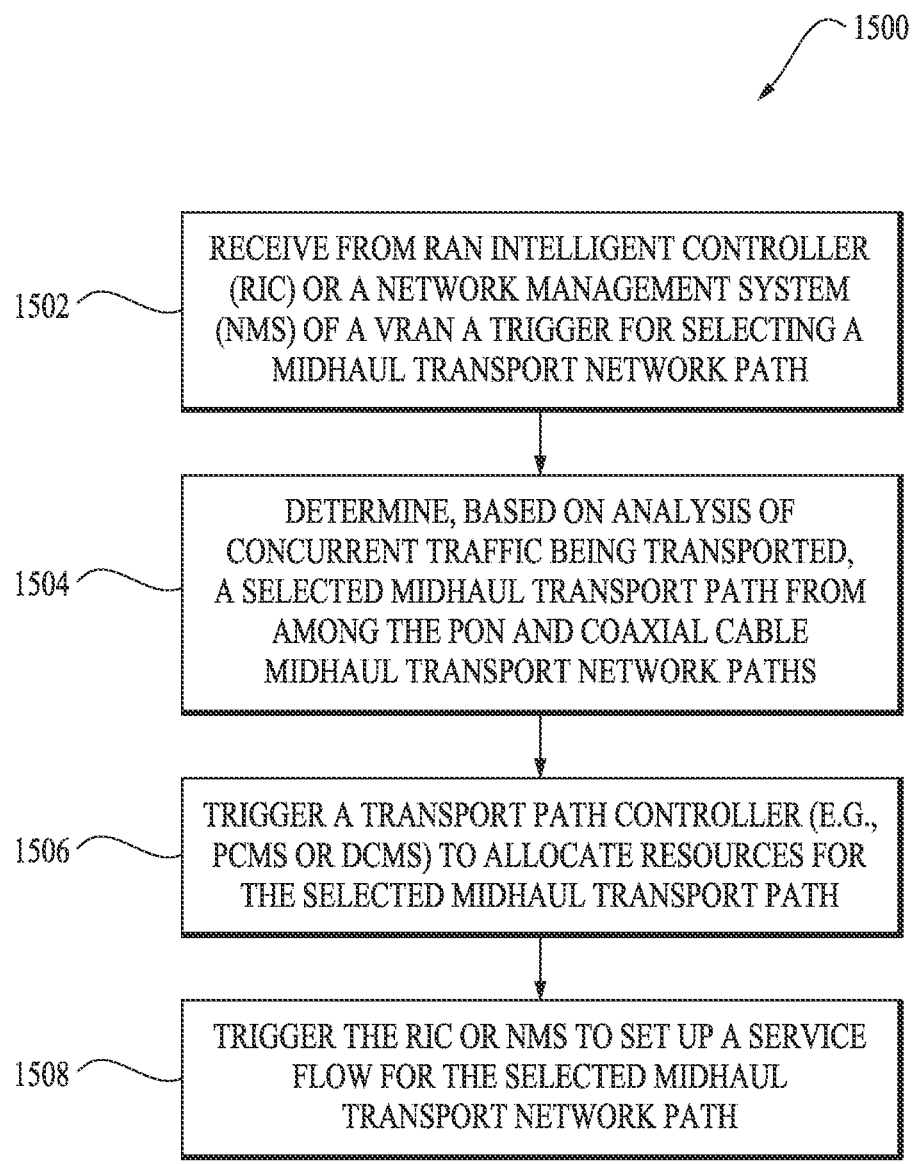

FIG. 15 is a flowchart of a process in accordance with one embodiment.

Figure 16:
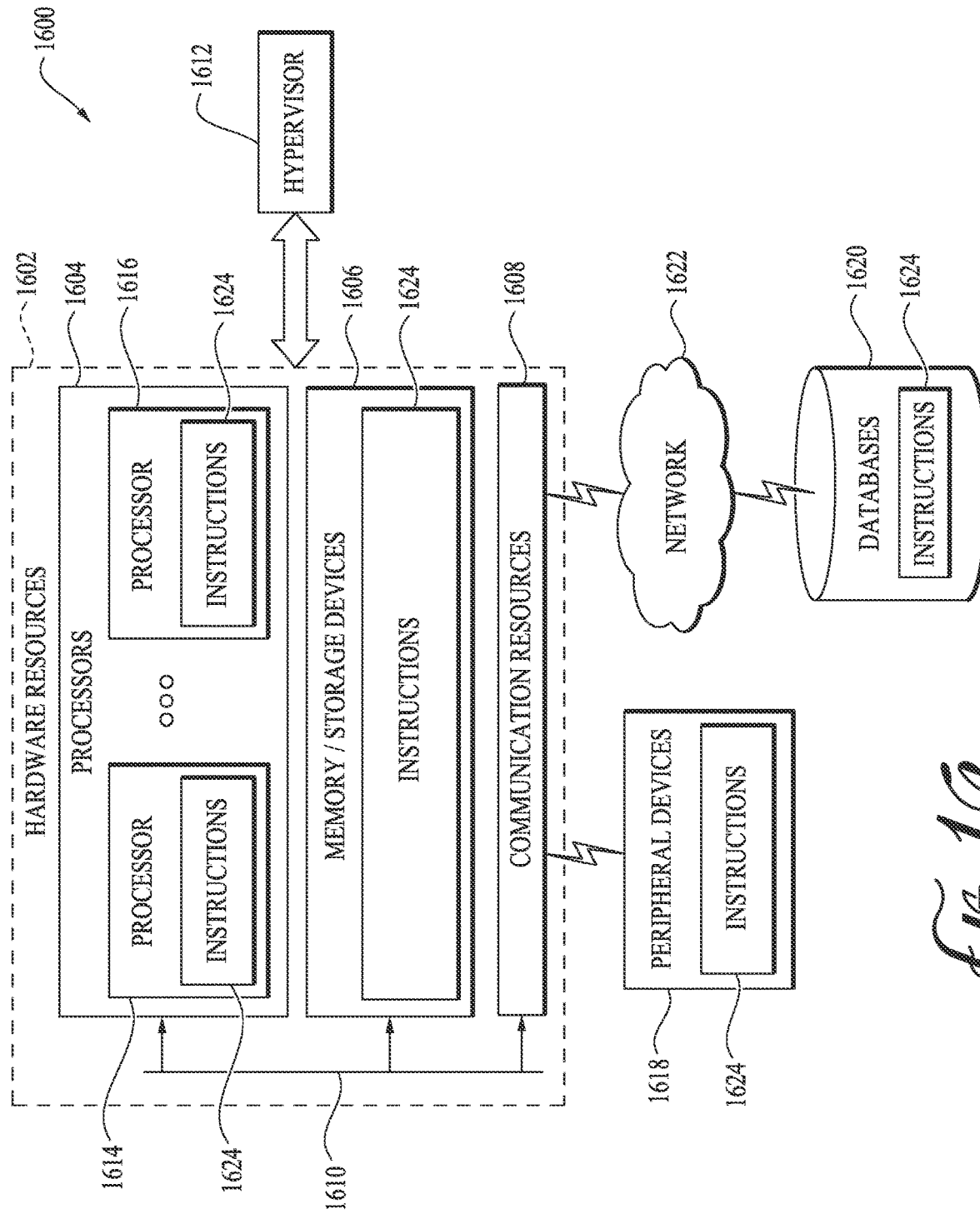

FIG. 16 is a block diagram of computing components for performing the disclosed procedures, in accordance with one embodiment.

DETAILED DESCRIPTION OF EMBODIMENTS

Figure 1:
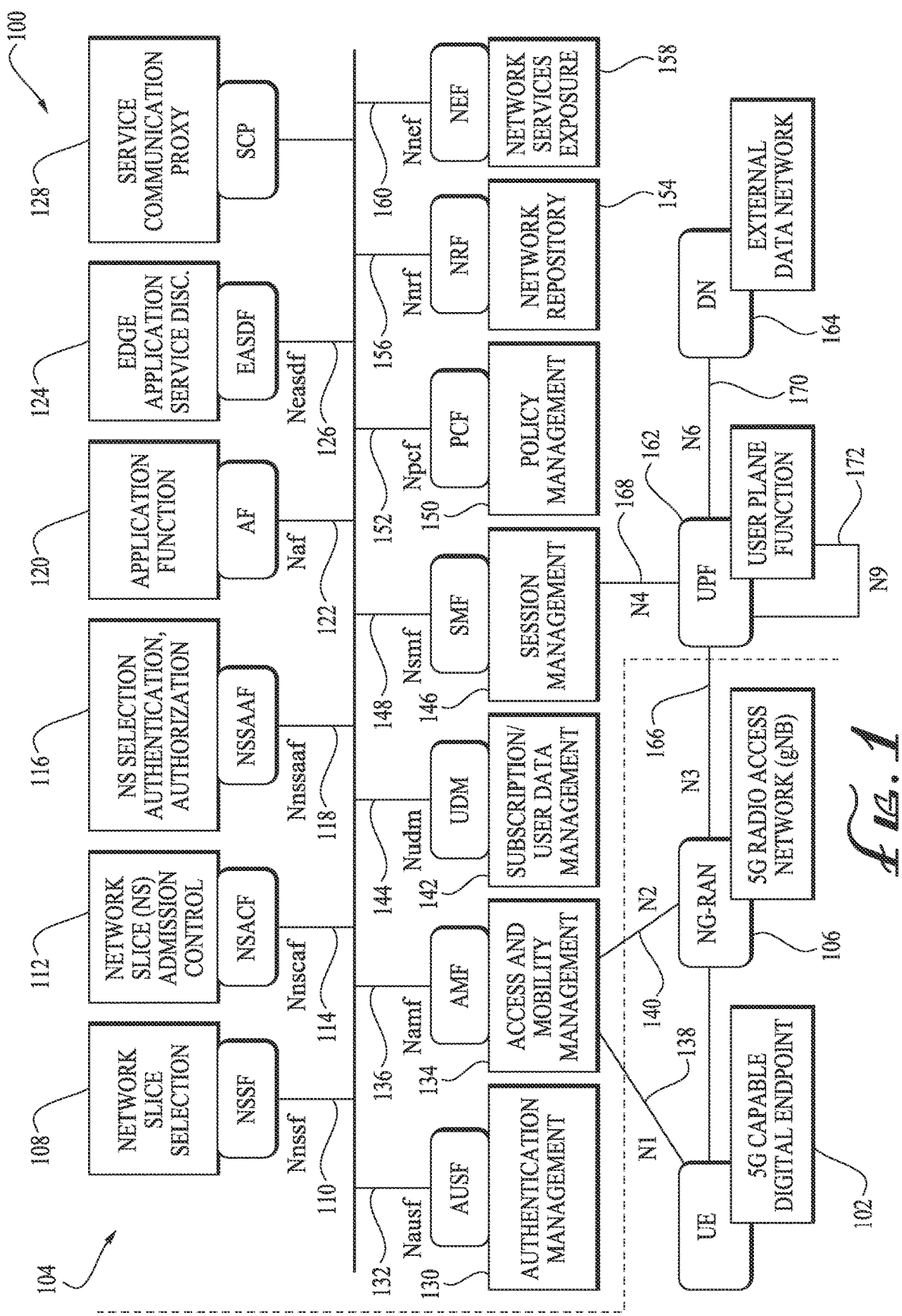
FIG. 1 is a block diagram of a 5G service-based model in accordance with one embodiment.

FIG. 1 shows a 5G system architecture 100, according to one embodiment. 5G system architecture 100 includes the radio base stations, antennas, and wireless technologies (such as massive MIMO and beamforming) that enable communication between user equipment (UE) 102 (like smartphones and IoT devices) and a 5G core network (5GC) 104. 5GC 104 implements a service-based architecture within 5G system architecture 100.

On a right side of the dashed line are network functions and interfaces for 5GC 104. 5GC 104 is a cloud-native, service-based architecture that enables flexible and scalable network functions in 5G. 5GC 104 includes network functions (described below) configured to offer various data and telecommunications services to customers/subscribers (e.g., users of UE 102) connected to 5GC 104 via an NG-RAN 106. The components of 5GC 104 may be implemented in one physical node or distributed across separate physical nodes including components to read and execute instructions from a machine-readable or computer-readable medium (e.g., a non-transitory machine-readable storage medium). In some embodiments, network function virtualization (NFV) may be utilized to virtualize any or all of the above-described network node functions via executable instructions stored in one or more computer-readable storage mediums (described in further detail below). A logical instantiation of 5GC 104 may be referred to as a network slice, and a logical instantiation of a portion of 5GC 104 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more 5GC components/functions. In the example of FIG. 1, 5GC 104 includes the following network functions and corresponding interfaces.

A network slice selection function (NSSF) 108 is responsible for selecting the appropriate network slice instance for a user based on subscription information, service requirements, and other factors. It helps allocate resources efficiently and manage network slices. Nnssf interface 110 is used to communicate network slice selection information and assistance data.

A network slice access control function (NSACF) 112 monitors and controls the number of registered UEs per network slice and/or the number of PDU sessions. Nnsacf interface 114 is the corresponding interface.

A network slice selection assistance function (NSSAAF) 116 creates slice authentication context for UE 102, and starts the slice-specific authentication and authorization procedure. Nnssaaf interface 118 is the corresponding interface.

An application function (AF) 120 is an external application or service that interacts with 5GC 104. It can request network resources, provide traffic steering rules, or request QoS (Quality of Service) for specific applications. Naf interface 122 it is used for AF 120 to request policy control, QoS, or network resource information from a PCF or to interact with the network through an NEF (described below).

An edge application service discovery function (EASDF) 124 supports the session breakout connectivity model. EASDF 124 acts as a domain name system (DNS) resolver to UE 102 and can complement the DNS queries with UE location-related information. This enables the DNS system to resolve to application servers close to the UE location. Neasdf interface 126 is the corresponding interface.

A service communication proxy (SCP) 128 allows the control plane network to handle and prioritize massive numbers of requests in real time. SCP 128 provides a single point of entry for a cluster of network functions, once they have been successfully discovered by the NRF (described below). This allows SCP 128 to become the delegated discovery point in a data center, offloading the NRF from the numerous distributed services meshes that would ultimately make-up a network operator's infrastructure. Given the nature of SCP 128 as a proxy for communication between network functions, the interfaces it uses will depend on the specific network functions it connects.

An authentication server function (AUSF) 130 is responsible for user authentication and generating security keys. It verifies the user's credentials and ensures secure access to the network. Nausf interface 132 between AUSF 130 and an access and mobility management function (AMF) 134 is used to communicate authentication-related information and security key material.

AMF 134 manages access, mobility, and connection for user devices. It is responsible for registration, connection establishment, and handovers between different access networks. Namf interface 136 is between AMF 134 and other core network functions, such as the NSSF, UDM, and session management function (SMF). It is used to exchange mobility, access, and session-related information. AMF 134 also has a N1 interface 138 with UE 102 and a N2 interface 140 with NG-RAN 106.

A unified data management (UDM) 142 stores and manages subscriber data, including authentication credentials, access profiles, and subscription information. It also provides this data to other network functions when needed. Nudm interface 144 is between UDM 142 and other core network functions, such as the AMF, AUSF, and PCF. It is used to communicate subscriber data, authentication credentials, access profiles, and policy information.

A session management function (SMF) 146 manages user sessions, establishes and maintains data connections, and enforces policy control rules. It also ensures the correct routing of data traffic between the user device and external networks. Nsmf interface 148 is between the SMF and other core network functions, such as the AMF, UPF, and PCF. It is used to exchange session, routing, and policy enforcement information.

A policy control function (PCF) 150 is responsible for making policy decisions, such as QoS and charging, based on subscription information and network conditions. It provides these decisions to other network functions for enforcement. Npcf interface 152 is between the PCF and other core network functions, such as the SMF, AF, and UDM. It is used for policy decision-making and to communicate policy rules and QoS information.

A network repository function (NRF) 154 maintains a repository of available network functions and their capabilities, enabling service discovery and load balancing among network functions. Nnrf interface 156 is between the NRF and other core network functions. It is used for service discovery, registration, and capability exposure among the network functions.

A network exposure function (NEF) 158 exposes 5G network capabilities and resources to third-party applications and services. It provides a standardized API for external entities to interact with the network. Nnef interface 160 is between the NEF and other core network functions, such as the AMF, SMF, and PCF. It is used to expose network resources, capabilities, and services to external applications and services through standardized APIs.

A user plane function (UPF) 162 is responsible for handling and forwarding user data traffic between UE 102 and external data networks (DN) 164, such as public internet, private networks, or other communication networks. UPF 162 performs various functions such as packet filtering, policy enforcement, and QoS management. A N3 interface 166, and N4 interface 168 and an N6 interface 170 connect UPF 162 to, respectively, NG-RAN 106, SMF 146, and DN 164. An N9 interface 172 is between two UPF's (i.e., the intermediate I-UPF and the UPF session anchor).

UE 102 may be a smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, networked or "smart" appliances, MTC devices, M2M, IoT devices, and/or the like. In some embodiments, UE 102 may be an IoT UE, which may comprise a network access layer designed for low-power IoT applications utilizing short-lived UE connections. An IoT UE may utilize technologies such as M2M or MTC for exchanging data with an MTC server or device via a PLMN, ProSe or D2D communication; sensor networks; or IoT networks. The M2M or MTC exchange of data may be a machine-initiated exchange of data. An IoT network describes interconnecting IoT UEs, which may include uniquely identifiable embedded computing devices (within the internet infrastructure), with short-lived connections. The IoT UEs may execute background applications (e.g., keep-alive messages, status updates, etc.) to facilitate the connections of the IoT network.

RANs use a radio access technology (RAT) to communicate between the RAN node and UE. NG-RAN 106 implements 5G RAT. In certain deployments, an E-UTRAN may also implement 5G RAT. Thus, NG-RAN is a term that encompasses both a 5G RAN and an evolved LTE RAN (eLTE RAN) as part of the 5G network architecture, designed to provide a unified and flexible radio access network that supports both 5G NR and 4G LTE technologies. As used herein, the term "NG-RAN node" (or simply NG-RAN) refers to a RAN node that operates in an NR or 5G system. In 5G wireless RANs, RAN nodes may include a 5G NR node (also referred to as a next-generation Node B or gNodeB (gNB)). In this disclosure, 5G RAN refers to the NG-RAN or gNB.

Figure 2:
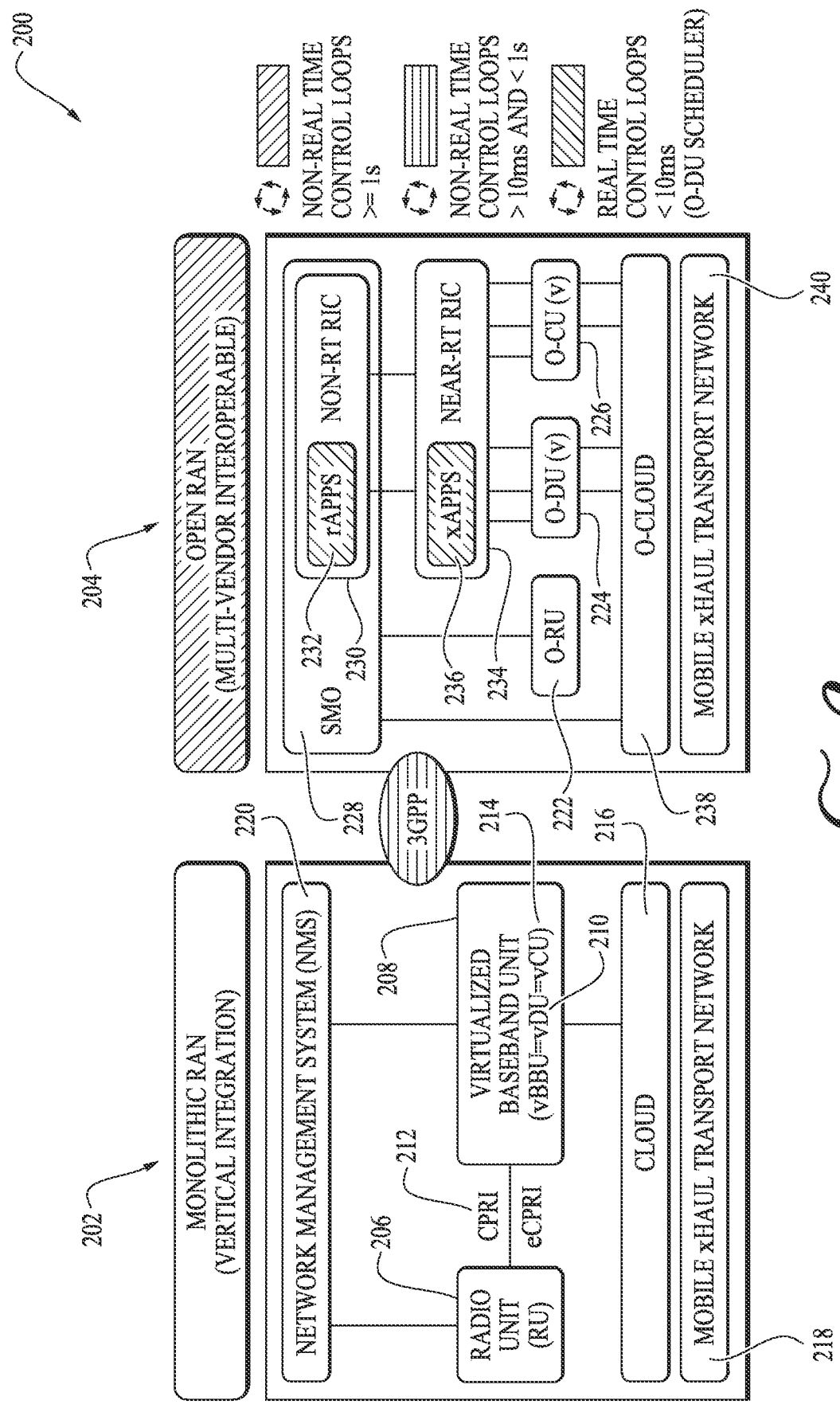
FIG. 2 is a block diagram showing different RAN architectures in accordance with one embodiment.

FIG. 2 shows a comparison between two different types of 5G RANs 200. Specifically, 5G RANs 200 include a monolithic RAN architecture 202 and an Open RAN (O-RAN) 204. These are described as follows.

Monolithic RAN architecture 202 includes a radio unit (RU) 206 and a virtual baseband unit (vBBU) 208. RU 206 is the part of the network that is physically closest to the end user and is responsible for the radio transmission and reception. RU 206 is typically located on a tower or other high structure. RU 206 exchanges data with a distributed unit (DU) 210 over a common public radio interface (CPRI) 212 or an enhanced CPRI (eCPRI). DU 210 is the part of the network that is responsible for processing and forwarding data between RU 206 and a central unit (CU) 214. In some embodiments, a DU may be located either near RU 206 or centrally (as in the case of vDU). CU 214 is the part of the network that is responsible for the control plane functions, such as managing the network and allocating resources. CU 214 is typically located in a central location, such as a data center. In some embodiments, RU, DU, and CU may be implemented in a gNB (i.e., gNB-RU, gNB-DU, and gNB-CU).

VBBU 208 is a software-based implementation of the baseband processing functions in a wireless network, typically as part of a cloud-RAN or virtualized RAN architecture. In a traditional RAN, a BBU is a hardware-based component responsible for processing baseband signals and managing radio resources. In a virtualized RAN, baseband processing functions are decoupled from the hardware and implemented as virtualized software components running on commercial off-the-shelf (COTS) hardware or a cloud 216 infrastructure. VBBU 208 can be dynamically scaled, allowing network operators to allocate resources more efficiently based on traffic demands and network conditions. In this example, vBBU 208 includes a distributed unit (DU) and a central unit (CU), both of which are virtualized (i.e., vDU and vCU).

Monolithic RAN architecture 202 shows a mobile xhaul transport network 218 (where "x" may be fronthaul, midhaul, or backhaul). Examples of mobile xhaul transport network 218 include fiber optic (e.g., software-defined passive optical network (SD-PON)), data over cable service interface specification (DOCSIS), microwave, and combinations and other types of transport networks.

In terms of a management layer, monolithic RAN architecture 202 shows a network management system (NMS) 220. NMS 220 is a set of tools and applications used by network operators to monitor, manage, and maintain monolithic RAN architecture 202. NMS 220 provides a centralized platform for network operators to control and optimize the performance of the radio access network, ensuring efficient operation, high reliability, and optimal user experiences.

In contrast to monolithic RAN architecture 202, O-RAN architecture 204 is a disaggregated approach, with open interfaces across the RAN, transport, cloud, and management layers. O-RAN is an evolution of the NG-RAN architecture, first introduced by the GSMA's 3GPP in its release 15 (5G version 1) technical specification TS 38.401. The O-RAN Alliance formed to undertake the advancement of NG-RAN philosophies, expanding on the scope of what was originally outlined by the 3GPP. O-RAN architectures adopt software defined network (SDN) and network function virtualization (NFV), while supporting enhanced network analytics and AI/ML enabled smart decision making. In the example of FIG. 2, O-RAN architecture 204 includes an O-RAN RU (O-RU) 222, an O-RAN DU (O-DU) 224, and an O-RAN CU (O-CU) 226. O-DU 224 or O-CU 226 are virtualized, in some embodiments.

A service management and orchestration (SMO) 228 for O-RAN architecture 204 is a software component responsible for managing and controlling the services and resources provided by the network to the users. SMO layer 228 monitors the quality of service and ensures that the network is delivering the required services efficiently and effectively. It also provides real-time insights into network performance, enabling the network operator to make informed decisions about resource allocation and network optimization. SMO layer 228 is a unified service management and orchestration layer that manages a service provider's 5G RAN, transport, and 5GC infrastructure equipment from multiple vendors. SMO layer 228 includes end-to-end (E2E) orchestration, RAN orchestration, and CN+transport orchestration, in some embodiments.

A non-real-time RAN intelligent controller (non-RT RIC) 230 of SMO layer 228 provides network intelligence and control functions, but operates outside of real-time constraints. Non-RT RIC 230 hosts rApps 232, which includes specialized microservices that do not require real-time processing, such as network planning, configuration management, and performance analysis. It provides network operators with valuable insights into network performance, resource utilization, and security, and enables them to make informed decisions about network configuration and resource allocation. Non-RT RIC 230 also terminates an O1 interface, which connects to every other RAN component for management and orchestration of network functionalities.

A near-RT RIC 234 hosts xApps 236, which in some examples configure near-RT RIC 234 to optimize radio spectrum efficiency and provide real-time radio network information and intelligence to 5GC 104 (FIG. 1). This enables the 5G network to make informed and automated decisions about network resources and configurations in real time. Near-RT RIC 234 communicates via an E2 interface with O-CU 226 and O-DU 224 to gather information about the network conditions and performance. It then processes this information and provides it to non-RT RIC 230 via an A1 interface, allowing the network to make real-time adjustments and optimizations to the network configuration.

In some embodiments, as defined in O-RAN's SMO framework, a network's O-CU 226 functions, O-DU 224 functions, and near-RT RIC 234 are defined as cloud-native virtualized functions which run on a cloud infrastructure referred to as an O-cloud 238. O-cloud 238 is a cloud computing platform made up of the physical infrastructure nodes using O-RAN architecture 204. It also creates and hosts the various virtual network functions (VNFs) used by RICs and other infrastructure elements. Non-RT RIC 230 and SMO layer 228 connect to O-cloud 238 though an O2 interface.

Figure 3:
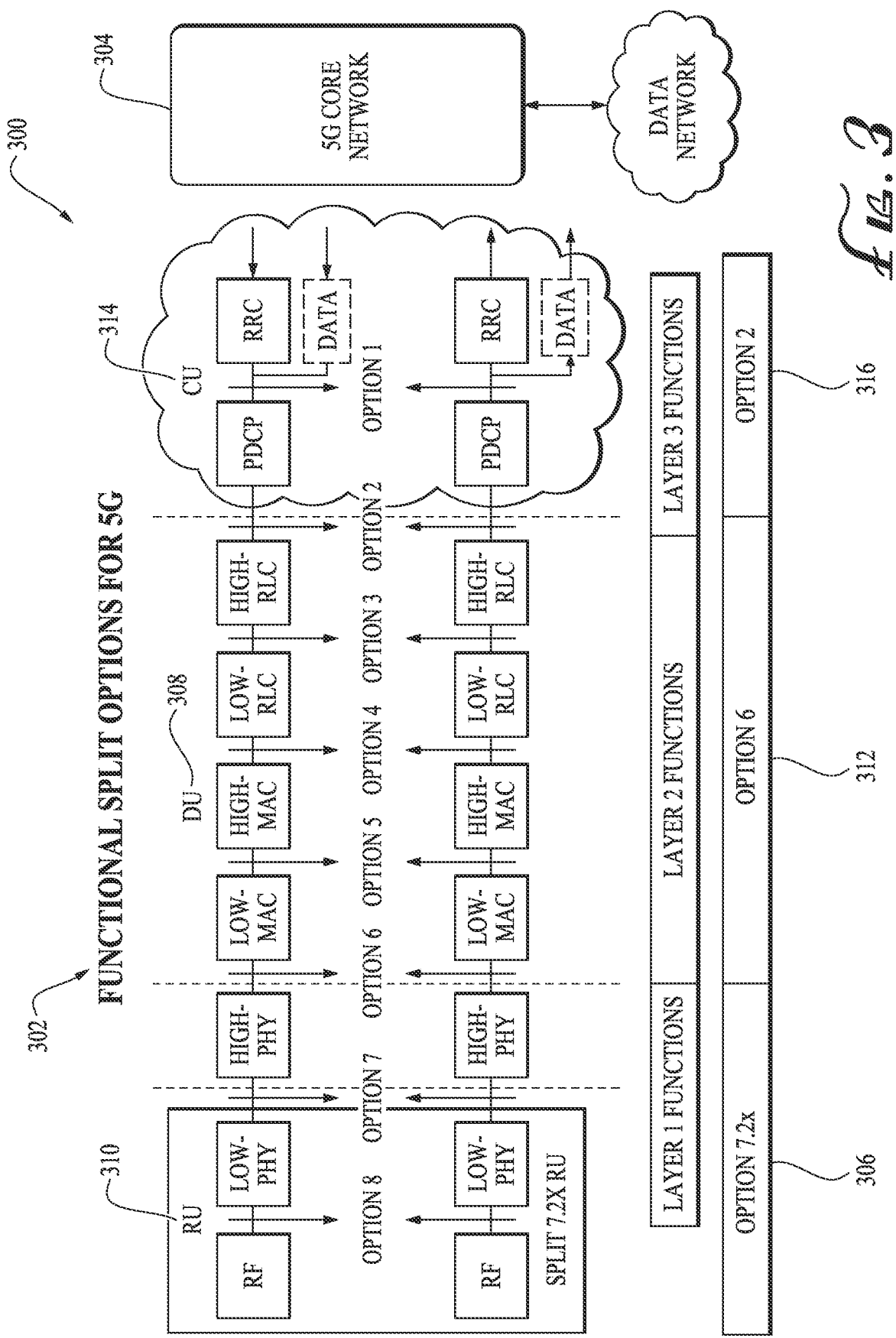
FIG. 3 is a block diagram showing functional split options in accordance with one embodiment.

FIG. 3 shows an overview of a 5G standalone (SA) architecture 300 with O-RAN split options 302, according to some embodiments. 5G SA architecture is a 5G network deployment that uses a 5G core network 304 along with the 5G NR access technology and does not rely on any 4G LTE infrastructure. In the context of 5G SA architecture 300, O-RAN split options 302 refer to the functional splits within the radio access network. These splits divide the RAN functions into different components, which can be independently sourced from different vendors and combined in a flexible manner. The main O-RAN split options 302 are described as follows.

O-RAN split 7.2 306: This is a functional split between an O-DU 308 and an O-RU 310 to divide the function of PHY Layer (Layer 1) into a High PHY (L1 processing) that resides in O-DU 308 and Low PHY (RF processing) that resides in O-RU 310. This simplifies O-RUs 310 and is subject to latency of an O-RAN fronthaul interface that connects O-RU 310 and O-DU 308, enabling the use of interoperable components from different vendors. The fronthaul interface is based on the eCPRI standard, which provides a more efficient and flexible way to transport radio data compared to the older CPRI standard.

O-RAN split 6 312: This is a MAC/PHY layer split. The MAC, RLC and upper layers are part of an O-CU 314. There is no Low PHY/High PHY split. Instead, the full stack of the PHY layer and the RF are in the DU/RU.

O-RAN split 2 316: In this split, RRC and PDCP are split from the Layer 2 RLC. Since only the PDCP and above layers are centralized at O-CU 314, O-RAN split 2 316 is less susceptible to network latencies and can operate under less stringent midhaul conditions.

Figure 4:
FIG. 4 is a block diagram showing a 5G communication system with O-RAN split options in accordance with one embodiment.

FIG. 4 shows a 5G communication system 400 with O-RAN split options 402 for different devices and use cases 404. For example, a split 7.2 406 is shown, which may further be split with a split 2 408. In another example, a split 6 410 is shown, which may further be split with a split 2 412.

As 5G SA network architectures embrace O-RAN standards and adopt the use of disaggregated software-defined radio access and core network functions, the mobile xhaul transport strategies become a consideration for E2E services delivery. Carriers with licensed or unlicensed low, mid, or high band spectrum availability intending to launch 5G mobile services based on SA network architecture designs should evaluate their backhaul scaling strategies to ensure they are capable of meeting latency demands placed by the emerging 5G applications.

Figure 5:
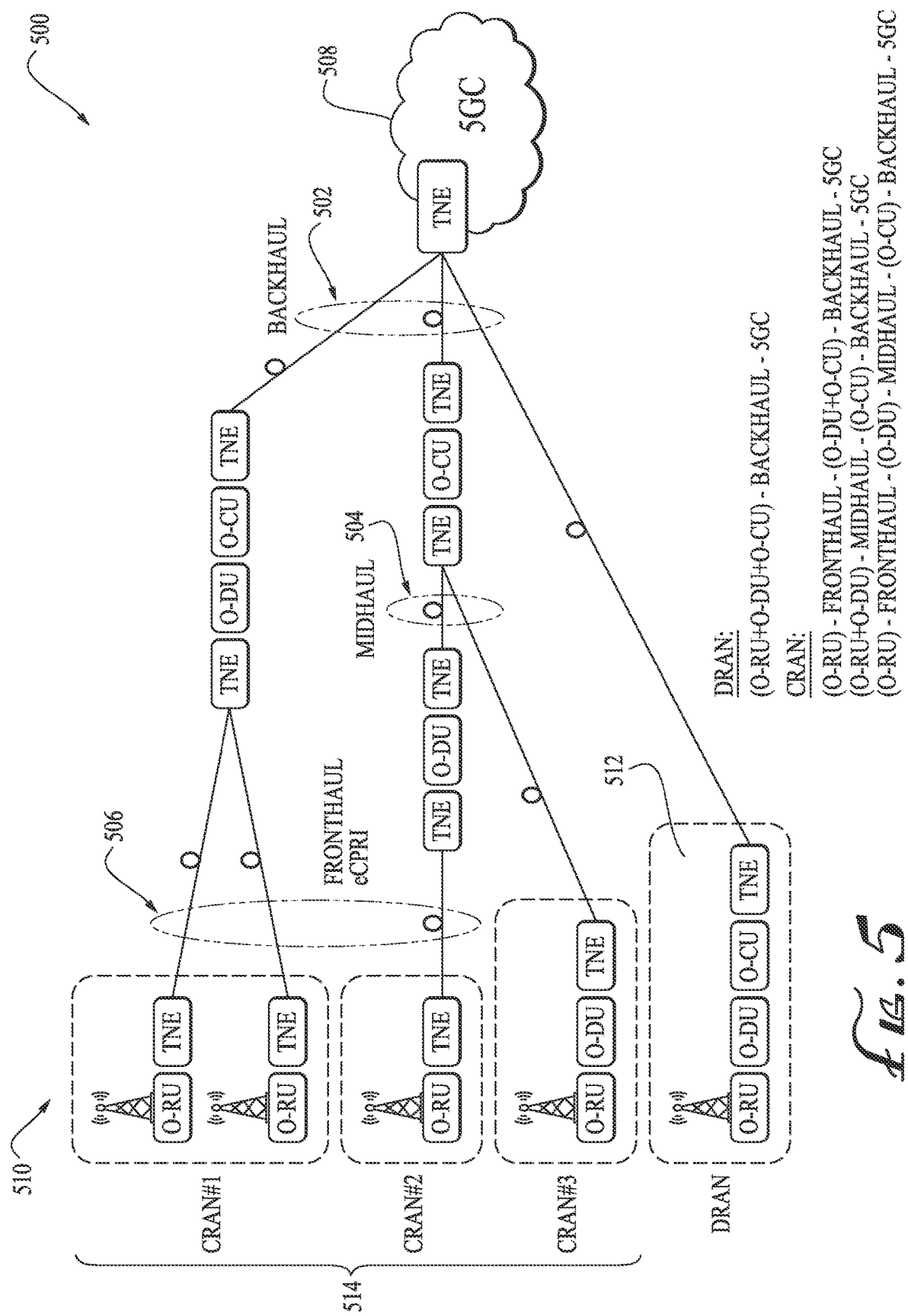
FIG. 5 is a block diagram showing fiber xhaul transport networks in accordance with one embodiment.

FIG. 5 provides an overview of examples of 5G O-RAN architectures 500 showing different fiber xhaul transport systems—including a fiber backhaul transport system 502, a fiber midhaul transport system 504, and a fiber fronthaul transport system 506—depending on operator deployment strategies for connecting to a 5GC 508.

At the side of radio access 510, distributed RAN (DRAN) and centralized RAN (CRAN) examples are shown. For instance, a DRAN 512 is a deployment in which a remote radio unit (RRU) and a baseband unit (BBU) are co-located at every cell site. Each radio site has all of its functions—O-RU, O-DU, O-CU, and transport network element (TNE)—in cell locations and connected back to 5GC 508 through fiber backhaul transport system 502. In contrast, in CRANs 514 the BBUs from several sites are grouped into a pool and located in one location. This leads to more efficient use of computing resources.

Figure 6:
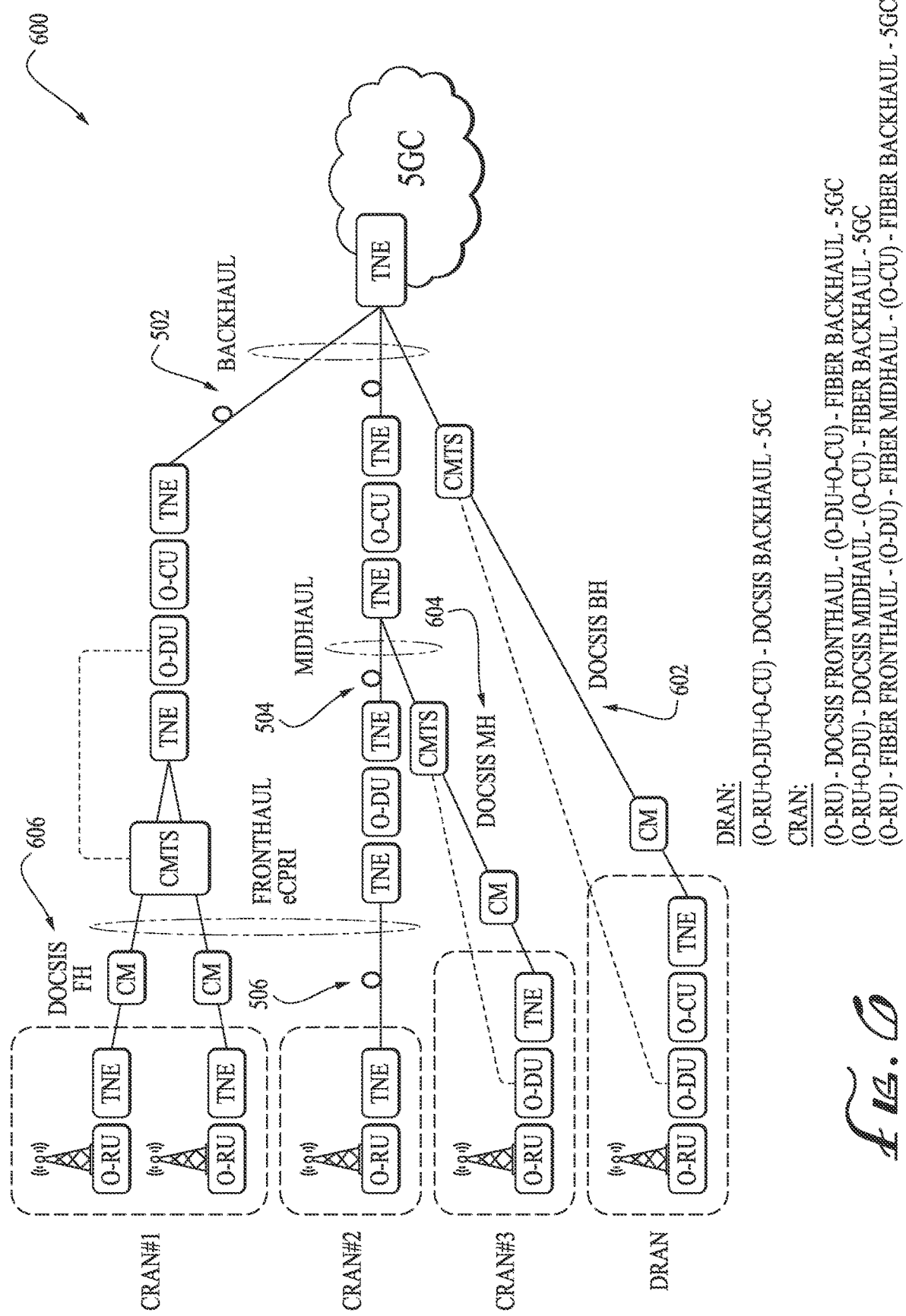
FIG. 6 is a block diagram showing fiber and cable xhaul transport networks in accordance with one embodiment.

FIG. 6 shows 5G O-RAN architectures 600 with DOCSIS and fiber xhaul transport systems. DOCSIS technology is specified in an international standard for delivering high-speed data, voice, and video services over hybrid fiber-coaxial (HFC) networks. As in FIG. 5, the examples include fiber backhaul transport system 502, fiber midhaul transport system 504, and fiber fronthaul transport system 506. In addition, 5G O-RAN architectures 600 shows examples of a DOCSIS backhaul 602, a DOCSIS midhaul 604, and a DOCSIS fronthaul 606. Each DOCSIS xhaul is provided by a cable modem (CM) and a cable modem termination system (CMTS). For simplicity, FIG. 6 shows a dedicated CMTS model.

Figure 7:
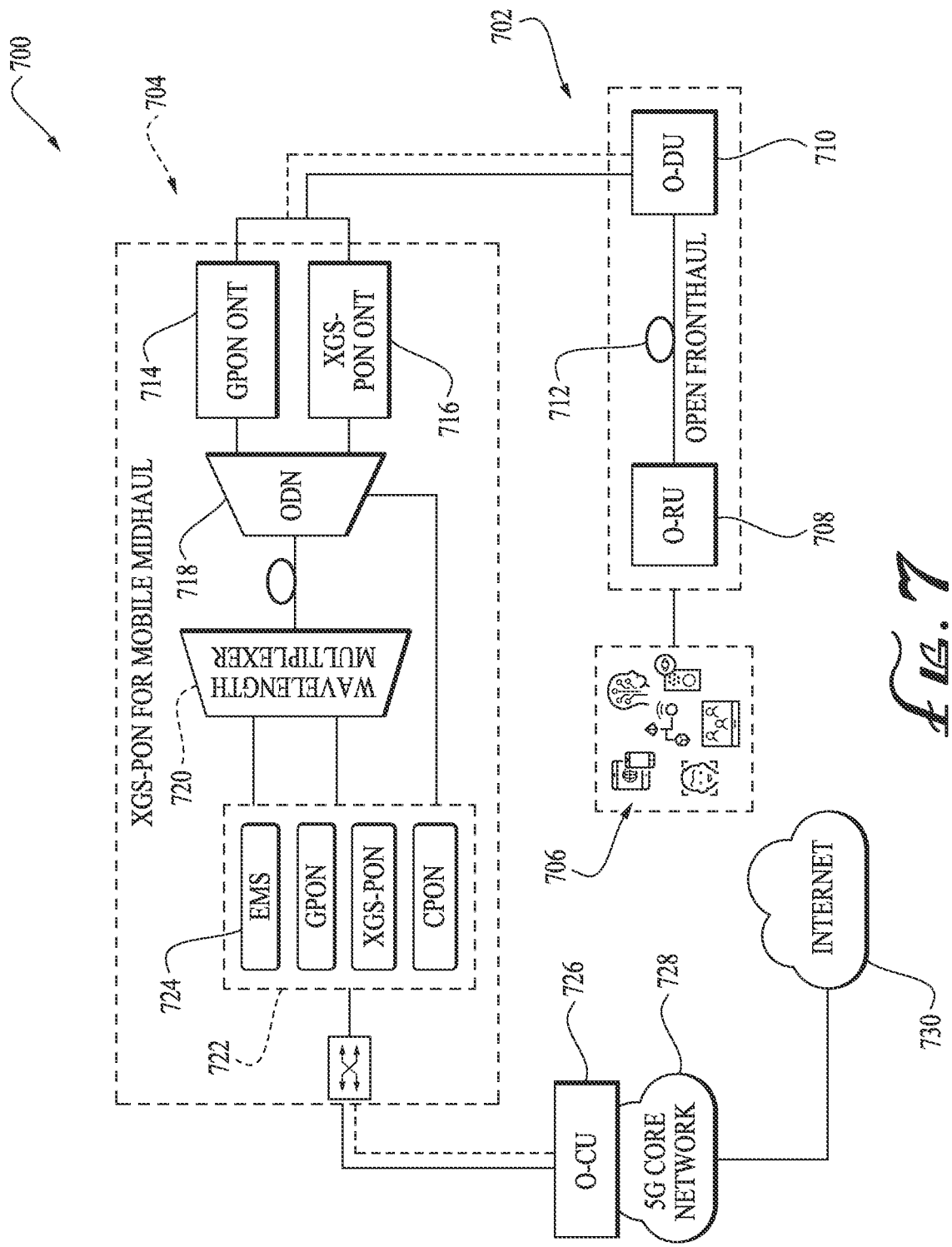
FIG. 7 is a block diagram showing a PON network in accordance with one embodiment.

FIG. 7 shows an example 5G network 700 having an O-RAN 702 with an SD-PON midhaul transport network 704 for convergence of 5G wireless and all optical broadband access network technologies. A 10-Gigabit-capable symmetric passive optical network (XGS-PON) provides for symmetrical multi-Gbps backhaul speeds. The convergence also provides for flexible deployment models to support enterprises, SMB, or consumers with enhanced QoE of end user 706.

As explained previously, O-RAN 702 includes an O-RU 708 connected to an O-DU 710 through an open fronthaul 712.

Through the converged 5G O-RAN 702 and SD-PON midhaul transport network 704, O-DU 710 accesses SD-PON midhaul transport network 704 through a gigabit passive optical network (GPON) optical network terminal (ONT) 714 and an XGS-PON ONT 716.

An optical distribution network (ODN) 718 provides fiber-optic connectivity with a wavelength multiplexer 720 for optical multiplexing to a software-defined, disaggregated combo-passive optical networking (SD-CPON) optical line termination (OLT) 722. ODN 718 is controlled by SD-CPON OLT 722. For instance, SD-CPON OLT 722 includes an element management system (EMS) 724 that provides comprehensive management, monitoring, and control in the PON.

After SD-PON midhaul transport network 704, information is provided to O-CU 726. O-CU 726 connects to a 5GC 728 for accessing internet 730.

Figure 8:
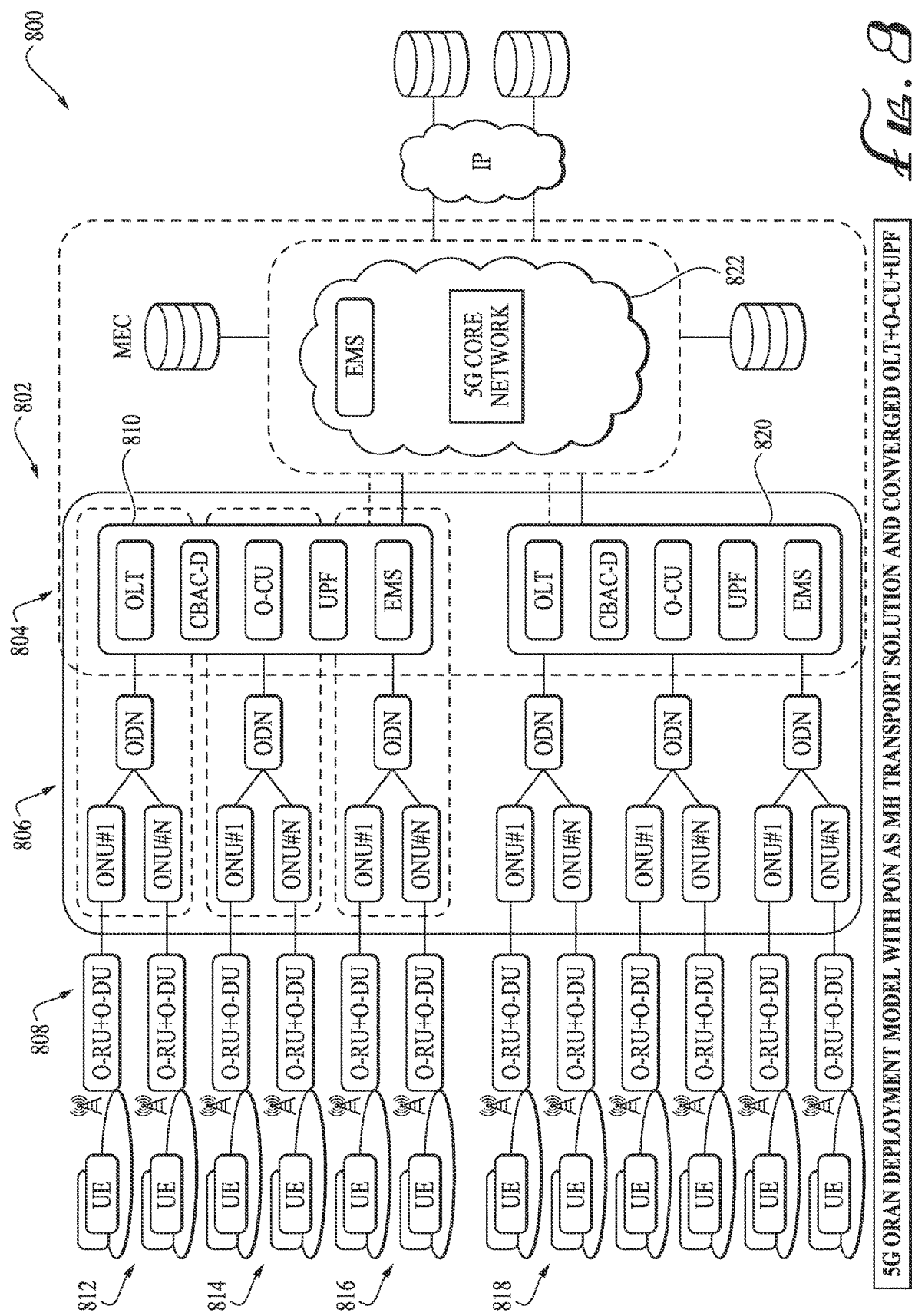
FIG. 8 is a block diagram showing PON midhaul transport in accordance with one embodiment.

FIG. 8 shows another example of an SD-PON enabled midhaul solution for O-RANs 800. In this example, a PON midhaul transport network 802 includes multiple OLTs 804 at a central office. OLTs 804 send optical signals to ODNs 806, which use an optical splitter to divide the signal into multiple paths. These paths are then carried to individual ONUs 808 or optical network terminals (ONTs) at the endpoints, where the signals are converted back into electrical signals for use by the end user. In the example of FIG. 8, PON midhaul transport network 802 includes a first OLT 810 for slices 812, 814, and 816, and 818; and a second OLT 820 for slice 818. Other embodiments may include a massive OLT for all the endpoints, a multiple vendor OLT in a geographic region, a software-defined OLT serving two slices, and another OLT serving other slices. PON midhaul transport network 802 also shows two ONUs 808 for each slice of first OLT 810, and six ONUs 808 for slice 818 of second OLT 820. Other embodiments may include N ONUs, e.g., where N is 32, 64, and so forth, corresponding to the number of small cells.

Each OLT 804 provides the interface between PON midhaul transport network 802 and a 5GC 822. A UPF and a border network gateway (BNG) in the PON can be in a centralized location. A CBAC-D is an intelligent distributed connect broadband access controller that abstracts the control and management functions of a traditional OLT platform and implements them in microservices scalable software architecture using virtualization concepts to provide high-speed symmetrical Gigabit per second services to the customers. Such a controller allows service providers to disaggregate the software functions from the hardware platforms within a monolithic and closed implementations to open-source open standards driven software solutions that can run on commercial off the shelf (COTS) hardware platforms. Such architectures allow for independent scaling of control and management functions that can make way for enhanced edge application intelligence by effectively using the COTS hardware resources in terms of CPU, memory and storage for other applications such as the UPF and BNG.

Figure 9:
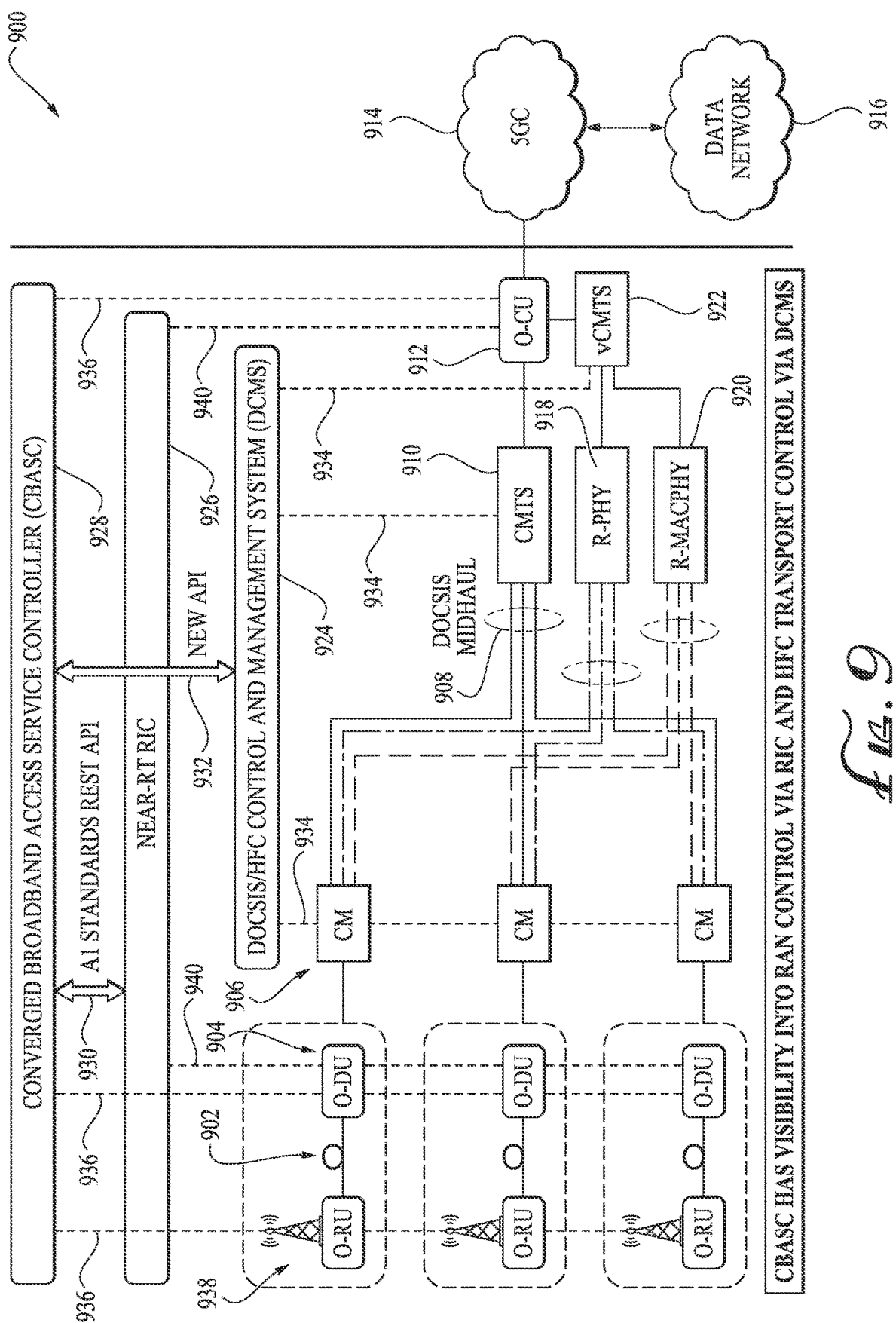
FIG. 9 is a block diagram showing a CBASC for a data over cable service interface specification (DOCSIS) midhaul in accordance with one embodiment.

FIG. 9 shows an example of an HFC transport network 900 combining both fiber-optic and DOCSIS coaxial cable technologies. This type of network is commonly used by cable TV and internet service providers to deliver broadband services to residential and commercial customers. In an HFC network, high-speed fiber-optic cables carry data from the provider's central office to local distribution nodes in neighborhoods or communities. From these nodes, coaxial cables are used to connect individual homes and businesses. The fiber-optic portion of the network is capable of supporting high data transmission rates over long distances with minimal signal loss, while the coaxial cable portion provides a cost-effective means of connecting individual subscribers within the last mile of the network. HFC networks provide a balance between the performance benefits of fiber-optic technology and the lower deployment costs associated with coaxial cables. However, they can face limitations in terms of higher symmetrical gigabit-per-second bandwidths (e.g., simultaneous transmission of 10 Gbps or higher in downstream and upstream) and signal quality compared to networks that are entirely fiber-based (e.g., XGS-PON and their evolution to higher speeds such as 25 Gbps/50 Gbps PON). As demand for higher-speed internet services continues to grow, some providers are upgrading their networks to FTTH or FTTP architectures, which replace the coaxial portion of the HFC network with fiber-optic connections directly to homes and businesses.

In the example of FIG. 9, each O-RU has an open fronthaul 902 with a corresponding O-DU 904. Each O-DU 904 connects to a corresponding CM 906 that provides a DOCSIS midhaul 908 with a CMTS 910. An O-CU 912 provides a connection to a 5GC 914 and a DN 916.

A remote PHY (R-PHY) device (RPD) 918, a remote MAC and PHY(R-MACPHY) device (RMD) 920, and a virtual CMTS (vCMTS) 922 are related to cable access network architecture, specifically DOCSIS midhaul 908, which is used to provide high-speed broadband services over HFC transport network 900. These technologies are part of the evolution of cable network infrastructure towards a more distributed and virtualized architecture, aiming to improve efficiency, scalability, and performance, helping cable operators adapt to the increasing demand for high-speed broadband services. They also enable operators to better compete with other broadband technologies, such as FTTH, FTTP, and 5G wireless networks.

R-PHY is a technology that moves the physical layer of the cable access network from the traditional centralized headend to a remote location closer to the customer, typically at the fiber node. This separation allows for increased network capacity, faster signal processing, reduced latency, and improved signal quality. In an R-PHY architecture, a CMTS or converged cable access platform (CCAP) core remains in the central office, while the physical layer processing is offloaded to RPD 918 in the field.

R-MACPHY takes the distributed architecture a step further by moving both the physical layer (PHY) and the media access control layer (MAC) of the cable access network to a remote location. In this configuration, the CMTS or CCAP core in the central office is reduced to a virtualized control plane function, while the MAC and PHY processing are offloaded to RMD 920 in the field. This approach can lead to enhanced scheduling, call admission control, even greater scalability, efficiency, and performance improvements compared to R-PHY.

Virtual CMTS is a technology that virtualizes the CMTS or CCAP functionality, enabling it to run on standard off-the-shelf hardware, such as servers, rather than dedicated proprietary equipment. By leveraging virtualization and cloud computing technologies, vCMTS 922 can improve network agility, scalability, and cost-efficiency. As shown in FIG. 9, vCMTS 922 is optionally combined with RPD 918 or RMD 920 distributed architectures to further optimize the cable access network.

With the implementation of DOCSIS midhaul 908, a DOCSIS/HFC control and management system (DCMS) 924 is provided. DCMS 924 is a containerized software platform that allows cable operators to manage, monitor, and control their HFC networks and DOCSIS infrastructure. For instance, DCMS 924 helps cable operators maintain and optimize their network performance, ensuring reliable and efficient service delivery to subscribers. As networks evolve with the adoption of technologies like R-PHY, R-MACPHY, and virtualization, DCMS 924 also adapts to support these advancements and maintain efficient network management. It typically includes a suite of tools and features that facilitate the management tasks, as follows. Network Configuration: DCMS 924 provides tools for configuring and managing network elements such as CMTS 910, CCAP, RPD 918, and RMD 920. This includes setting up IP addresses, allocating bandwidth, and defining service profiles. Device Provisioning: DCMS 924 is responsible for provisioning customer devices, such as cable modems and set-top boxes, to enable them to access the network and receive services. This entails assigning configuration files, registering devices, and managing subscriber authentication. Fault Management: DCMS 924 helps cable operators detect, diagnose, and resolve network issues by monitoring the performance of network elements and providing alarms or notifications in case of faults or outages. Performance Monitoring: DCMS 924 collects and analyzes network performance data, such as signal levels, noise levels, and bandwidth utilization, to help operators identify potential issues, optimize network capacity, and improve service quality. Security Management: DCMS 924 enforces security policies and manages access control for the network infrastructure, ensuring the integrity and confidentiality of data transmitted over the HFC transport network 900. Reporting and Analytics: DCMS 924 generates various reports and analytics to help cable operators make data-driven decisions related to network planning, capacity management, and service quality improvements.

FIG. 9 also shows near-RT RIC 926. As described previously, near-RT RIC 926 provides for control of O-DUs 904. Each O-DU 904 connects to a CM 906 and CMTS 910 via the midhaul HFC transport architecture to transfer the bidirectional digital baseband data to/from O-CU 912. O-CU 912 aggregates O-DU 904 functions and a ratio of O-DU to O-CU depends on the operator network traffic dimensioning in a given geographical location. The traffic loading of the midhaul HFC transport network can impact the number of connected 5G users that can actively engage in end-to-end high-speed data transfers besides other conversational services.

FIG. 9 also shows a CBASC 928. CBASC 928 includes communication to near-RT RIC 926 over an A1 interface 930 using a REST API. CBASC 928 also communicates with DCMS 924 over an API 932. CBASC 928 works across the spectrum of broadband access technologies and interacts via standards-based APIs to synthesize the data driven intelligence and generate dynamic triggers to switch the traffic across transport network options that exist in a given location. Bidirectional traffic may be split across transport paths based on the learning processes and network traffic patterns over time. This helps them to instantiate dynamic network slicing instantiation/modification/de-instantiation on demand and manage via CBASC 928.

FIG. 9 also represents with dashed lines a data exchange 934 for collecting information concerning faults, configuration and performance monitoring information associated with CMTS 910 and vCMTS 922 towards DCMS 924. Other dashed lines represent a data exchange 936 (e.g., over an O1 interface or management plane) of operations, administration, and maintenance (OA&M) information and other management information between O-RU 938, O-DU 904, and O-CU 912 network functions towards CBASC 928 (via near-RT RIC 926). An E2 interface 940 is also shown to near-RT RIC 926.

Figure 10:
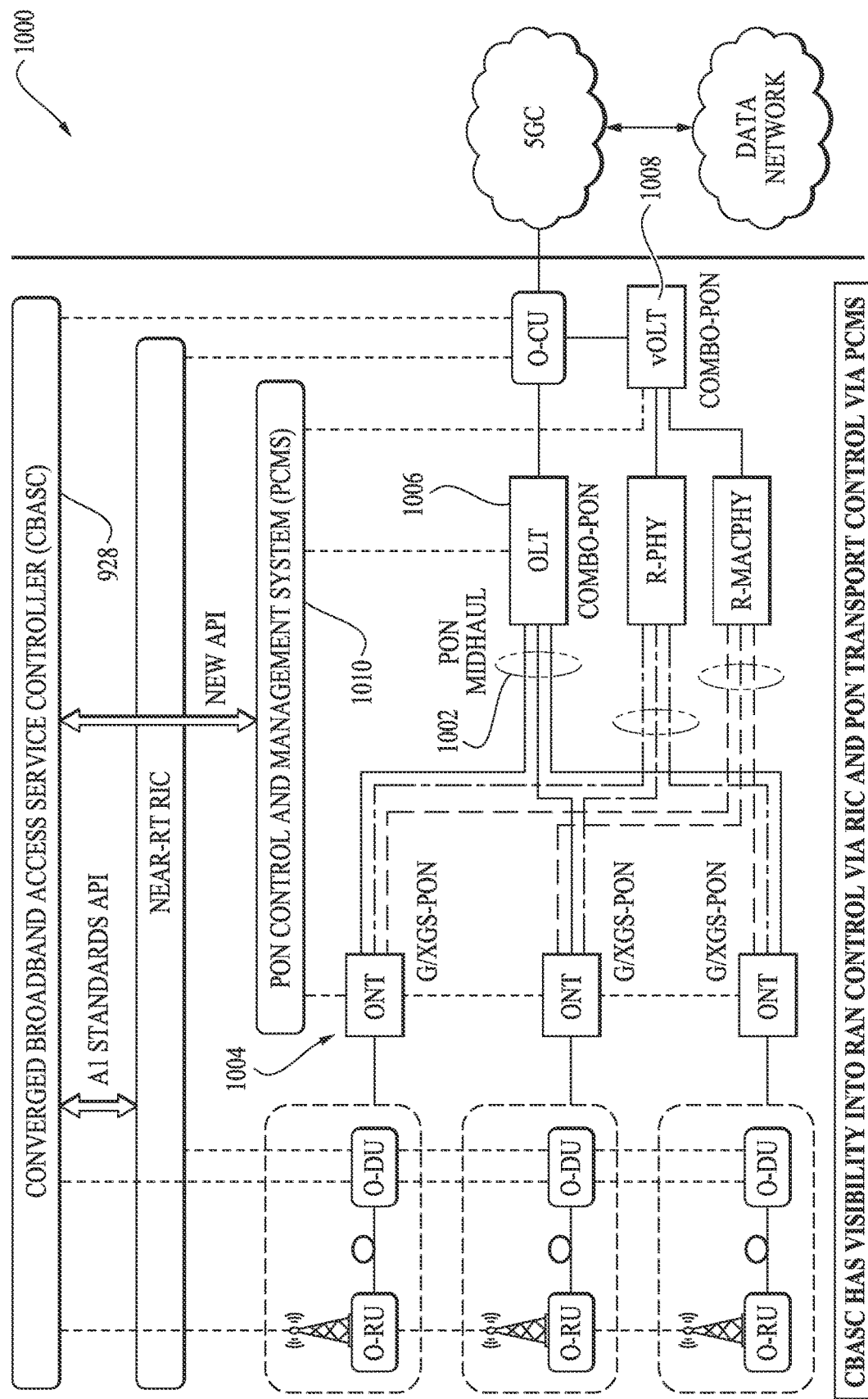
FIG. 10 is a block diagram showing a CBASC for a PON midhaul in accordance with one embodiment.

FIG. 10 shows and example of an SD-PON transport network 1000. The architecture is similar to that shown in FIG. 9, except fiber technologies are used instead of cable technologies. Specifically, a PON midhaul 1002 formed between ONTs 1004 and an OLT 1006. A virtual OLT (vOLT) 1008 is also provided for R-PHY and R-MACPHY. A PON control and management system (PCMS) 1010 manages PON midhaul 1002. As explained previously, CBASC 928 generates triggers to switch the traffic across transport network options.

Figure 11:
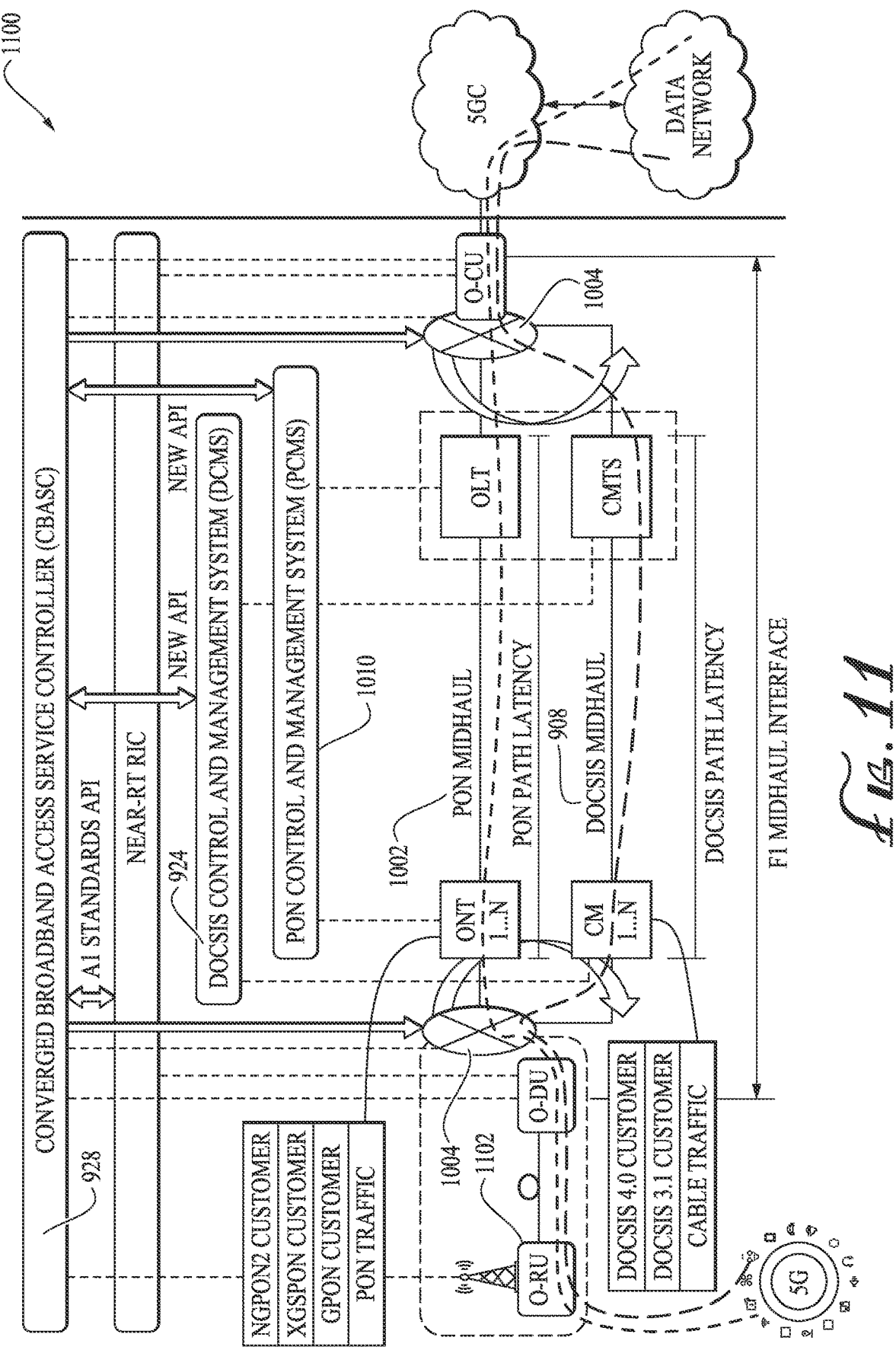
FIG. 11 is a block diagram showing a CBASC for a combined DOCSIS and PON midhaul in accordance with one embodiment.

FIG. 11 shows a combination HFC and SD-PON transport network 1100, which represents a combination of HFC transport network 900 (FIG. 9) and SD-PON transport network 1000 (FIG. 10). By leveraging this combination HFC and SD-PON transport network 1100, some traffic from an O-RU 1102 can be controlled to flow through SD-PON transport network 1000 whereas other traffic from O-RU 1102 is controlled to flow through DOCSIS midhaul 908. Smart switches 1104 are controlled via API triggers from CBASC 928 to dynamically switch the traffic between the PON and HFC networks when both such paths exist for midhaul data transfer.

The transport path selection is based on the analysis of concurrent traffic being transported and processed in near real time by each of the domains and reinforced learning functions of the scheduler as well as the aggregate traffic flows in each of the domains. The following FIG. 12A-FIG. 14C show further example scenarios for how CBASC 928 controls the midhaul resources, with FIG. 12A-FIG. 12C showing an example for upstream transport, FIG. 13A-FIG. 13C showing an example of downstream transport, and FIG. 14A-FIG. 14C showing dynamic switching of a given user path from one domain to another due to variations in the domain-specific traffic handling.

FIG. 12A-FIG. FIG. 12C show a process 1200 for establishing new 5G user access PDU session for a UE 1202. Initially, a CBASC 1204 collects from PCMS 1206 and DCMS 1208, respectively, PON traffic information 1210 and DOCSIS/HFC traffic information 1212. PCMS 1206 and DCMS 1208 are each referred to generally as a transport path controller.

In some embodiments, PON traffic information 1210 includes bidirectional traffic information carried by the OLT platform, its unique node identifier with the location information, its active port-level configuration, slicing configuration based on single port or port-level aggregation, utilization in terms of CPU, memory, bandwidth utilization, services, service flows, and customer or service VLAN tags supported per port and slice to carry broadband traffic towards the subtending ONTs. This information is used for the determination of the transport path described later.

In some embodiments, DOCSIS/HFC traffic information 1212 includes bidirectional traffic information carried by the CMTS/vCMTS platform, its unique node identifier with the location information, its active port-level configuration, slicing configuration based on single port or port-level aggregation, utilization in terms of CPU, memory, bandwidth utilization, services, service flows, and customer or service VLAN tags supported per port and slice to carry broadband traffic towards the subtending CMs. This information is used for the determination of the transport path described later.

Next, at step 1214, UE 1202 gains access into the 5G system with a data session that has associated session information (e.g., location, flow type, flow priority, flow SLA, or other information). At step 1216, management information of a DU 1218 is exchanged with CBASC 1204. This management information, in some embodiments, includes any of the following: IP addressing (IPv4/IPv6) of DU peer nodes (e.g., RU, CU, CBASC, RIC), peer nodes and active links availability, control information such as O-RU operating mode, radio unit configuration parameters such as antenna management layers, power, active/idle mode of operation, state information-lock/unlocked, active radio carriers, switched off radio carriers, and other types of related information. This information is used for the determination of the transport path described later.

Similarly, at step 1220, management information of a CU 1222 is exchanged with CBASC 1204. This management information, in some embodiments, includes any of the following: IP addressing (IPv4/IPv6) of CU peer nodes (e.g., DU, RIC, AMF, UPF, CBASC), peer nodes interfaces and active transport availability, CU traffic loading and utilization, and other types of related information. This information is used for the determination of the transport path described later.

Next, at step 1224, user service information from DU 1218 is exchanged with an RIC 1226. Service information, in some embodiments, includes any of the following: logical channel identity information, call admission control, service flow information, number of service flows requested, resources allocated per service flow, carrier allocated for a given service, total number of users scheduled by the MAC, service flow specific data throughput information, and other types of related information. This information is used for the determination of the transport path described later.

RIC 1226 then queries CBASC 1204 at step 1228 to determine between PON and DOCSIS the selected transport path for a service flow. The path selection and switching may be based on data-driven intelligence fed back to CBASC 1204 from DCMS 1208 and PCMS 1206. For example, during the transport path selection and switching process as a result of high-definition video streaming or interactive gaming related service data flow trigger at UE 1202, CBASC 1204 considers the management information received directly from both DU 1218 and CU 1222 network functions to ensure there is a proper pairing of DU 1218 and CU 1222 along with their common peer nodes such as RIC 1226, based on IP addressing, regional proximity, active link status of the transport paths and their availability towards RIC 1226 with quality-of-service tagging.

At the same time, CBASC 1204 will receive upstream quality-of-service related information from the DU 1218 via RIC 1226 and then takes these service flow characteristics (e.g., 5QI, latency, packet delay budget, supported slice, UE category, UE priority access, UE camping cell, DU resource utilization, etc.) into consideration when coordinating the transport path pairing with peer CU 1222 network function. CBASC 1204 also receives the application layer information from CU 1222 via RIC 1226 to ensure there is a coordinated transport path pairing mechanism with CU 1222 for a given service flow delivery.

In some embodiments, there are regional-level RIC nodes that interface with a mapped cluster of DU 1218 and CU 1222 nodes serving a target RAN service area. A group of such regional RIC nodes could interface with CBASC 1204 as the centralized service controller along with the regionalized PCMS and DCMS systems. CBASC 1204 derives the transport path selection based on a correlation of cross-functional protocol stack and service layer intelligence received from (regional) RIC 1226 in conjunction with (regional) DCMS 1208 and (regional) PCMS 1206 to determine which specific transport paths provided by DCMS 1208 and PCMS 1206 (based on their path characteristics, under the current traffic loading at a given time in that specific geographic location) provides the desired application and end-to-end service layer performance in terms of throughput, latency, packet loss, and jitter required per flow tied to the service run in flight. Thus, at step 1230, CBASC 1204 performs an analysis of midhaul transport paths and internal mapping to determine the desired possible path for a given DU, supported service flow based on time of day, availability, utilization, location, and service criteria.

In this example, CBASC 1204 selects the PON, so it signals at step 1232 the best transport path that is chosen for a given service flow PON so as to allocate the resources. The selection of PON as a preferred transport path by CBASC 1204 may be based on the analysis of incoming application and management layer triggers from RAN network functions (DU 1218, CU 1222, RIC 1226) for specific services targeted for delivery as well as the transport paths and resources available with their respective quality-of-service provided by PCMS 1206 and DCMS 1208 management systems. Within the PON transport paths provided by PCMS 1206, there may be G-PON, XGS-PON and combo-PON ports available in a given OLT node for selection. CBASC 1204 may perform an intelligent selection of the specific PON port within an identified OLT node (with a unique ID) based on an internal mapping of PCMS 1206 metadata such as the vendor specific OLT, type of OLT, OLT identity, ports available within a given OLT type, resource utilization of the available PON ports, PON ports grouping, PON ports slicing, PON ports dedicated for certain type of services etc., and the ingress/egress traffic flow characteristics received from RIC 1226.

Based on the service flow characteristics, CBASC 1204 analyzes its internal transport resources mapping table based on the feed from PCMS 1206 and allocates the G-PON port for low speed-tier bandwidth applications, whereas it allocates the XGS-PON port for high speed-tier bandwidth such as interactive high-definition streaming, gaming applications with premium service offerings, taking into account the concurrent utilization of the allocated G-PON/XGS-PON port. For instance, CBASC 1204 receives from PCMS 1206 VLAN tag information for a specific service flow associated with a given PDU session and other optional information in the service flow to identify a network slice allocation.

Then, at step 1234, CBASC 1204 signals to RIC 1226 the transport path resources. For instance, RIC 1226 receives the VLAN tag information and the like. If RIC 1226 receives the transport slice information from CBASC 1204, it could relay it to DU 1218 via the application layer data exchange using the E2 interface and DU 1218 could store it for mapping the DU-RIC contextual data.

Next at step 1236, RIC 1226 signals to DU 1218 the transport path selected. This signaling also includes the resource allocation information such as the VLAN tag.

At step 1238, DU 1218 and CU 1222 have established connectivity via the PON. At step 1240, traffic of DU 1218 is tagged with the corresponding service VLANs so that it is transported via the PON network. At step 1242, DU traffic connected to a specific ONT-OLT pair is transported to CU 1222. At step 1244, CU 1222 signals over a 5GC control plane (CP) 1246 to set up the session with an AMF (not shown). The AMF sets up the session with a 5GC user plane (UP) 1248 at step 1250. At step 1252, the PDU is established for UE 1202. Next, at step 1254, UE 1202 can then send user plane uplink traffic to 5GC UP 1248. CBASC 1204 continues monitoring traffic 1256.

FIG. 13A-FIG. 13C show a process 1300 for UE terminated message delivery. As described previously, CBASC 1204 collects from PCMS 1206 and DCMS 1208, respectively, PON traffic information 1210 and DOCSIS/HFC traffic information 1212. Also, at step 1216, management information of a DU 1218 is exchanged with CBASC 1204. Similarly, at step 1220, management information of a CU 1222 is exchanged with CBASC 1204.

At step 1302, a new 5G user in the system is targeted for message delivery (location, message type, flow priority, flow SLA, etc.). A new user, or a group of users, in a given location using 5G-capable devices (UEs) is targeted for short-message-service (SMS) delivery, and such SMS messages could have a certain length, priority or criticality, guaranteed vs best-effort delivery, etc.

At step 1304, user service information is delivered to CU 1222 from 5GC CP 1246. At step 1306, user service information is exchanged with RIC 1226. At step 1308, RIC 1226 queries CBASC 1204 to determine the optimal path (PON vs. DOCSIS) for message delivery.

At step 1310, CBASC 1204 performs an analysis of midhaul transport paths and internal mapping to determine the selected path for a given CU, supported service flow based on time of day, availability, utilization, location, and service criteria. This analysis is similar to that described previously with reference to step 1230.

In this example, CBASC 1204 selects the DOCSIS, so at step 1312, CBASC 1204 signals DCMS 1208 the best transport path that is chosen for a given service flow DOCSIS. The selection of DOCSIS as a preferred transport path by CBASC 1204 may be based on analysis of incoming application and management layer triggers from RAN network functions (DU 1218, CU 1222, RIC 1226) for specific services targeted for delivery as well as the transport paths and resources available with their respective quality-of-service provided by PCMS 1206 and DCMS 1208 management systems.

Within the DOCSIS transport paths provided by DCMS 1208, there could be resources available in a given CMTS/vCMTS node based on DOCSIS 3.1/4.0 standards for selection. DOCSIS 4.0 is an advanced version of the standards that supports enhanced functionality with extended spectrum and full duplex technologies.

CBASC 1204 may perform an intelligent selection of the resources within an identified CMTS node (with a unique ID) based on an internal mapping of DCMS 1208 metadata such as the vendor specific CMTS, DOCSIS standard supported for backwards compatibility, type of CMTS (physical/virtualized, CMTS with Remote PHY Device (RPD), CMTS with remote MAC-PHY Device (RMPD)), CMTS with Low Latency DOCSIS feature capability, CMTS identity, ports available within a given CMTS type, resource utilization of the available CMTS, CMTS slicing, CMTS resources dedicated for certain type of services etc., and the ingress/egress traffic flow characteristics received from RIC 1226.

Based on the service flow characteristics, CBASC 1204 analyzes its internal transport resources mapping table based on the feed from DCMS 1208 and allocates the appropriate CMTS 3.1 node level resources for low speed-tier bandwidth applications, whereas it allocates the CMTS 4.0 node-level resources for high speed-tier bandwidth such as interactive high-definition streaming or gaming applications with premium service offerings, taking into account the concurrent utilization of the allocated CMTS nodal resources. Similar to the previously described example, CBASC 1204 receives from DCMS 1208 information to identify the transport network resource allocation.

At step 1314, CBASC 1204 signals to RIC 1226 the selected transport path resources. This signaling provides the resource allocation. If RIC 1226 receives the transport slice information from CBASC 1204, it could relay it to CU 1222 via the application layer data exchange using the E2 interface and CU 1222 stores it for mapping the CU-RIC contextual data.

At step 1316, RIC 1226 signals to CU 1222 the transport path selected so as to identify the resource allocation. At step 1318, DU 1218 and CU 1222 have established connectivity via the DOCSIS.

At step 1320, traffic of CU 1222 is connected to a specific CM-CMTS pair to be transported to DU 1218. At step 1322, traffic of CU 1222 is tagged with the proper service VLAN (s) to transport via the DOCSIS network to DU 1218. At step 1324, message delivery from DU 1218 to UE 1202 is provided via control plane signaling. At step 1326, incoming messages delivery from messaging center to 5GC CP 1246 (e.g., SMSF and AMF) is received. At step 1328, control plane message delivery from 5GC CP 1246 to UE 1202 is provided via RAN (CU 1222 and DU 1218). As before, CBASC 1204 continues monitoring traffic 1256.

FIG. 14A-FIG. 14C show a process 1400 for intelligent switching of transport paths, according to one embodiment. As described previously, CBASC 1204 collects from PCMS 1206 and DCMS 1208, respectively, PON traffic information 1210 and DOCSIS/HFC traffic information 1212. This is also referred to as steady state (SS) information at any given time in the networks. In addition, at step 1402, RIC 1226 and CBASC 1204 exchange 5G traffic information as a reference point measurement of traffic conditions in the network in time on any given day in a given location. An example reference point is a busy hour, which varies across service providers based on their network design, planning and engineering, operations, optimization, and other factors.

At step 1404, a first UE 1406 is connected to DU 1218 for exchanging data transfers. At step 1408, DU 1218 is connected to CU 1222 via PON network selected as preferred method by CBASC 1204. At step 1410 CU 1222 is connected to 5GC UP 1248 and exchanging user data. At step 1412, E2E UE-network data transfers are provided with first UE 1406 via PON as midhaul transport. At step 1414, a second UE 1416 has its power on in the cell with eMBB data flow. At step 1418, management information for second UE 1416 is exchanged between DU 1218 and CBASC 1204. At step 1420, user service information is exchanged with RIC 1226. At step 1422, RIC 1226 queries CBASC 1204 to determine the optimal path (PON vs DOCSIS) for a service flow. At step 1424, CBASC 1204 selects DOCSIS path for second UE 1416 based on its service requests. At step 1426, second UE 1416 exchanges data transfer with 5GC UP 1248 via DOCSIS as the midhaul transport in RAN. At step 1428, CBASC 1204 decides to switch the transport path for second UE 1416 based on DOCSIS network outage in the serving cell location. At step 1430, CBASC 1204 instructs RIC 1226 to switch the DU-CU path for DOCSIS to PON due to service outage. At step 1432, traffic of DU 1218 is tagged with the corresponding service VLANs to transport via PON network. At step 1434, second UE 1416 exchanges data transfer with 5GC UP 1248 via PON as the midhaul transport in RAN.

FIG. 15 shows a process 1500, performed by a CBASC for a 5G network, the 5G network including a PON midhaul transport network path and a coaxial cable midhaul transport network path. In block 1502, process 1500 receives from RAN intelligent controller (RIC) or a network management system (NMS, FIG. 2) of a vRAN a trigger for selecting a midhaul transport network path. In block 1504, process 1500 determines, based on analysis of concurrent traffic being transported, a selected midhaul transport path from among the PON and coaxial cable midhaul transport network paths. In block 1506, process 1500 triggers a transport path controller (e.g., PCMS or DCMS) to allocate resources for the selected midhaul transport path. In block 1508, process 1500 triggers the RIC or NMS to set up a service flow for the selected midhaul transport network path.

Process 1500 may also include the concurrent traffic information having PON traffic information.

Process 1500 may also include the PON traffic information having one or more of bidirectional traffic information carried by an OLT platform, active port-level configuration, CPU utilization, memory utilization, bandwidth utilization, services, service flows, and VLAN tags supported per port to carry broadband traffic towards subtending ONTs.

Process 1500 may also include the transport path controller being a PCMS, and monitoring the PON traffic information from the PCMS. Process 1500 may also include receiving from the PCMS VLAN tag information for a specific service flow associated with a corresponding PDU session to identify a network slice allocation. Process 1500 may also include receiving from the PCMS an indication of the PON transport network outage in a serving cell location, and triggering the RIC to switch transport networks from PON path to the coaxial cable transport network path.

Process 1500 may also include the concurrent traffic information having DOCSIS/HFC traffic information.

Process 1500 may also include the DOCSIS/HFC traffic information having one or more of bidirectional traffic information carried by a CMTS or vCMTS platform, active port-level configuration, CPU utilization, memory utilization, bandwidth utilization, services, service flows, and VLAN tags supported per port to carry broadband traffic towards subtending CMs.

Process 1500 may also include the transport path controller being a DCMS, and monitoring the DOCSIS/HFC traffic information from the DCMS. Process 1500 may also include receiving from the DCMS VLAN tag information for a specific service flow associated with a corresponding PDU session to identify a network slice allocation. Process 1500 may also include receiving from the DCMS an indication of a coaxial cable transport network outage in a serving cell location, triggering the RIC to switch transport networks from the coaxial cable transport network path to the PON path.

Process 1500 may also include the triggering of the RIC causing the RIC to trigger a DU for a new PDU session.

Process 1500 may also include the triggering of the RIC causing the RIC to trigger a CU for a UE terminated message delivery.

Process 1500 may also include receiving management information from a DU.

Process 1500 may also include receiving management information from a CU.

FIG. 16 is a block diagram illustrating components 1600, according to some example embodiments, configured to read instructions from a machine-readable or computer-readable medium (e.g., a non-transitory machine-readable storage medium) and perform any one or more of the methods discussed herein (or portions thereof), such as discussed for process 1200 (FIG. 12A-FIG. 12C), process 1300 (FIG. 13A-FIG. 13C), process 1400 (FIG. 14A-FIG. 14C), or process 1500 (FIG. 15).

Specifically, FIG. 16 shows a diagrammatic representation of hardware resources 1602 including one or more processors 1604 (or processor cores), one or more memory/storage devices 1606, and one or more communication resources 1608, each of which may be communicatively coupled via a bus 1610. For embodiments where node virtualization (e.g., NFV) is utilized, a hypervisor 1612 may be executed to provide an execution environment for one or more network slices/sub-slices to utilize hardware resources 1602.

Processors 1604 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio frequency integrated circuit (RFIC), another processor, or any suitable combination thereof) may include, for example, a processor 1614 and a processor 1616.

Memory/storage devices 1606 may include main memory, disk storage, or any suitable combination thereof. Memory/storage devices 1606 may include, but are not limited to, any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

Communication resources 1608 may include interconnection or network interface components or other suitable devices to communicate with one or more peripheral devices 1618 or one or more databases 1620 via a network 1622. For example, communication resources 1608 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1624 may comprise software, a program, an application, an applet, an app, or other executable code for causing at least any of processors 1604 to perform any one or more of the methods discussed herein. Instructions 1624 may reside, completely or partially, within at least one of processors 1604 (e.g., within the processor's cache memory), memory/storage devices 1606, or any suitable combination thereof. Furthermore, any portion of instructions 1624 may be transferred to hardware resources 1602 from any combination of peripheral devices 1618 or databases 1620. Accordingly, the memory of processors 1604, memory/storage devices 1606, peripheral devices 1618, and databases 1620 are examples of computer-readable and machine-readable media.

In light of this disclosure, skilled persons will appreciate that many changes may be made to the details of the above-described embodiments without departing from the underlying principles of the invention. For example, FIG. 9-FIG. 14C show examples of the CBASC coordination via a RIC, but in some embodiments a vRAN that has a split between the DU and CU may have its transport paths managed by a CBASC. The scope of the present invention should, therefore, be determined only by claims and equivalents.

What is claimed is:

1. A method, performed by a converged broadband access service controller (CBASC) for a 5G network, the 5G network including a passive optical network (PON) midhaul transport network path and a coaxial cable midhaul transport network path, the method comprising:
   receiving from a RAN intelligent controller (RIC) a trigger for selecting a midhaul transport network path;
   determining, based on analysis of concurrent transport network traffic information, a selected midhaul transport path from among the PON and coaxial cable midhaul transport network paths;
   triggering a transport path controller to allocate resources for the selected midhaul transport path; and
   triggering the RIC to set up a service flow for the selected midhaul transport network path.

2. The method of claim 1, in which the concurrent transport network traffic information includes PON traffic information, and in which the PON traffic information includes one or more of bidirectional traffic information carried by an OLT platform, active port-level configuration, CPU utilization, memory utilization, bandwidth utilization, services, service flows, and VLAN tags supported per port to carry broadband traffic towards subtending ONTs.

3. The method of claim 1, in which the concurrent traffic information includes PON traffic information, and in which the transport path controller is a PCMS, the method further comprising monitoring the PON traffic information from the PCMS.

4. The method of claim 3, further comprising receiving from the PCMS VLAN tag information for a specific service flow associated with a corresponding PDU session to identify a network slice allocation.

5. The method of claim 4, further comprising:
   receiving from the PCMS an indication of the PON transport network having an outage in a serving cell location; and
   triggering the RIC to switch transport networks from PON path to the coaxial cable transport network path.

6. The method of claim 1, in which the concurrent traffic information includes DOCSIS/HFC traffic information, and in which the DOCSIS/HFC traffic information includes one or more of bidirectional traffic information carried by a CMTS or vCMTS platform, active port-level configuration, CPU utilization, memory utilization, bandwidth utilization, services, service flows, and VLAN tags supported per port to carry broadband traffic towards subtending CMs.

7. The method of claim 1, in which the concurrent traffic information includes DOCSIS/HFC traffic information, and in which the transport path controller is a DCMS, the method further comprising monitoring the DOCSIS/HFC traffic information from the DCMS.

8. The method of claim 7, further comprising receiving from the DCMS VLAN tag information for a specific service flow associated with a corresponding PDU session to identify a network slice allocation.

9. The method of claim 8, further comprising:
   receiving from the DCMS an indication of a coaxial cable transport network outage in a serving cell location;
   triggering the RIC to switch transport networks from the coaxial cable transport network path to the PON path.

10. The method of claim 1, in which the triggering of the RIC causes the RIC to trigger a CU for a UE terminated message delivery or a DU for a new PDU session.

11. The method of claim 1, further comprising receiving first management information from a DU and receiving second management information from a CU.

12. A method, performed by a converged broadband access service controller (CBASC) for a 5G network, the 5G network including a passive optical network (PON) midhaul transport network path and a coaxial cable midhaul transport network path, the method comprising:
   receiving from a network management system (NMS) of a vRAN a trigger for selecting a midhaul transport network path;
   determining, based on analysis of concurrent transport network traffic information, a selected midhaul transport path from among the PON and coaxial cable midhaul transport network paths;
   triggering a transport path controller to allocate resources for the selected midhaul transport path; and
   triggering the NMS to set up a service flow for the selected midhaul transport network path.

13. The method of claim 12, in which the concurrent transport network traffic information includes PON traffic information, and in which the PON traffic information includes one or more of bidirectional traffic information carried by an OLT platform, active port-level configuration, CPU utilization, memory utilization, bandwidth utilization, services, service flows, and VLAN tags supported per port to carry broadband traffic towards subtending ONTs.

14. The method of claim 12, in which the concurrent traffic information includes PON traffic information, and in which the transport path controller is a PCMS, the method further comprising monitoring the PON traffic information from the PCMS.

15. The method of claim 14, further comprising receiving from the PCMS VLAN tag information for a specific service flow associated with a corresponding PDU session to identify a network slice allocation.

16. The method of claim 15, further comprising:
receiving from the PCMS an indication of the PON transport network having an outage in a serving cell location; and
triggering the RIC to switch transport networks from PON path to the coaxial cable transport network path.

17. The method of claim 12, in which the concurrent traffic information includes DOCSIS/HFC traffic information, and in which the DOCSIS/HFC traffic information includes one or more of bidirectional traffic information carried by a CMTS or vCMTS platform, active port-level configuration, CPU utilization, memory utilization, bandwidth utilization, services, service flows, and VLAN tags supported per port to carry broadband traffic towards subtending CMs.

18. The method of claim 12, in which the concurrent traffic information includes DOCSIS/HFC traffic information, and in which the transport network controller is a DCMS, the method further comprising monitoring the DOCSIS/HFC traffic information from the DCMS.

19. The method of claim 18, further comprising receiving from the DCMS VLAN tag information for a specific service flow associated with a corresponding PDU session to identify a network slice allocation.

20. The method of claim 19, further comprising:
receiving from the DCMS an indication of a coaxial cable transport network outage in a serving cell location;
triggering the RIC to switch transport networks from the coaxial cable transport network path to the PON path.

21. The method of claim 12, in which the triggering of the RIC causes the RIC to trigger a DU for a new PDU session or a CU for a UE terminated message delivery.

22. The method of claim 12, further comprising receiving first management information from a DU and receiving second management information from a CU.

* * * * *